(12) United States Patent
Chen

(10) Patent No.: US 7,463,425 B1
(45) Date of Patent: Dec. 9, 2008

(54) ZOOM LENS SYSTEM

(75) Inventor: Su-Due Chen, Taichung (TW)

(73) Assignee: Zoom Precision Optical Electronic Co., Ltd., Taichung (TW)

( * ) Notice: Subject to any disclaimer, the term of this patent is extended or adjusted under 35 U.S.C. 154(b) by 16 days.

(21) Appl. No.: 11/778,765

(22) Filed: Jul. 17, 2007

(51) Int. Cl.
*G02B 15/14* (2006.01)

(52) U.S. Cl. .................. 359/681; 359/689; 359/708

(58) Field of Classification Search .......... 359/676, 359/681, 689, 708, 748, 753
See application file for complete search history.

(56) References Cited

U.S. PATENT DOCUMENTS

| | | | |
|---|---|---|---|
| 5,268,793 A | 12/1993 | Saka et al. | |
| 5,424,869 A * | 6/1995 | Nanjo | 359/687 |
| 5,543,969 A | 8/1996 | Ito | |
| 5,627,682 A | 5/1997 | Nagaoka | |
| 2005/0243437 A1* | 11/2005 | Hozumi et al. | 359/687 |

* cited by examiner

*Primary Examiner*—Joseph Martinez
(74) *Attorney, Agent, or Firm*—Alan Kamrath; Kamrath & Associates PA

(57) ABSTRACT

A zoom lens system is disclosed that includes a front first lens group including a first lens of divergent meniscus and a second lens of plano-convex; an intermediate second lens group including a third lens of plano-concave, a fourth lens of plano-concave, and a fifth lens of plano-convex; and a rear third lens group including a sixth lens of double-convex, a seventh lens of double-convex, an eighth lens of plano-concave, and a ninth lens of plano-concave. The sixth and ninth lenses are non-spherical lenses formed of a plastic material, and the zoom lens system satisfies the following conditions (a) $0.16 < f_w/f_1 < 0.21$ (b) $-0.78 < f_w/f_2 < -0.64$ (c) $0.70 < f_w/f_3 < 0.75$ (d) $0.47 < \log Z_3 / \log Z < 0.76$.

8 Claims, 21 Drawing Sheets

ZOOM LENS SYSTEM

BACKGROUND OF THE INVENTION

1. Field of Invention

The invention relates to a zoom lens system for a compact video camera, an electronic still camera, etc. and more particularly to such a zoom lens system having a first lens group of positive diopter, a second lens group of negative diopter, and a third lens group of positive diopter.

2. Description of Related Art

Recently, compact zoom lens systems as the most important component for a compact video camera, an electronic still camera, etc. are developed and commercially available. A compact zoom lens has the benefits of decreasing weight and greatly reducing cost. As a result, for example, the size, weight, and unit price of a compact video camera are decreased greatly.

A typical zoom lens system has a first lens group of positive diopter, a second lens group of negative diopter, and a third lens group of positive diopter. Position of the first lens group of positive diopter is fixed during zooming and focusing. To the contrary, the second and third lens group of diopters are changed along an optical axis.

There have been numerous suggestions in prior patents (e.g., U.S. Pat. Nos. 5,268,793, 5,627,682, and 5,543,969) for zoom lens systems. In U.S. Pat. No. 5,543,969, OAL/IMA of the zoom lens (i.e., ratio of total track of zoom system to image sensor size) is about 22. In U.S. Pat. No. 5,627,682, OAL/IMA is about 21. In U.S. Pat. No. 5,268,793, OAL/IMA is higher than 26. It is known that the diameter of zoom lens is mainly determined by image sensor size and zoom ratio. Thus, the smaller of OAL/IMA (i.e., ratio of total track of zoom system to image sensor size) the better of the image quality will be. However, each of the above patents is not desirable due to its high such ratio. Thus, the need for improvement still exists.

SUMMARY OF THE INVENTION

It is therefore one object of the invention to provide a zoom lens system having advantages of high zoom ratio and being compact.

In one aspect of the invention the lenses of comprised of non-spherical ones made of a plastic material, and glass ones so as to reduce the manufacturing cost and facilitate assembly.

To achieve the above and other objects, the invention provides a zoom lens system comprising:

a front first lens group including a first lens of divergent meniscus and a second lens of plano-convex;

an intermediate second lens group including a third lens of plano-concave, a fourth lens of plano-concave, and a fifth lens of plano-convex; and a rear third lens group including a sixth lens of double-convex, a seventh lens of double-convex, an eighth lens of plano-concave, and a ninth lens of plano-concave, wherein the sixth and ninth lenses are non-spherical lenses formed of a plastic material, and the zoom lens system satisfies the following conditions (a)-(d):

$0.16 < f_w/f_1 < 0.21$     (a)

$-0.78 < f_w/f_2 < -0.64$     (b)

$0.70 < f_w/f_3 < 0.75$     (c)

$0.47 < \log Z_3/\log Z < 0.76$     (d)

where $f_w$ is a focal length of the overall system at a wide angle end, $f_1$ is a focal length of the first lens group, $f_2$ is a focal length of the second lens group, $f_3$ is a focal length of the third lens group, Z is the change ratio of magnification of the overall system, $Z_3$ is a change ratio ($Z_3 = m3t/m3w$) of magnification of the third lens group, m3t is a lateral magnification of the third lens group at a telescopic end, and m3w is a lateral magnification of the third lens group at a wide angle end.

The above and other objects, features and advantages of the invention will become apparent from the following detailed description taken with the accompanying drawings.

DETAILED DESCRIPTION OF THE INVENTION

Figure 1A:
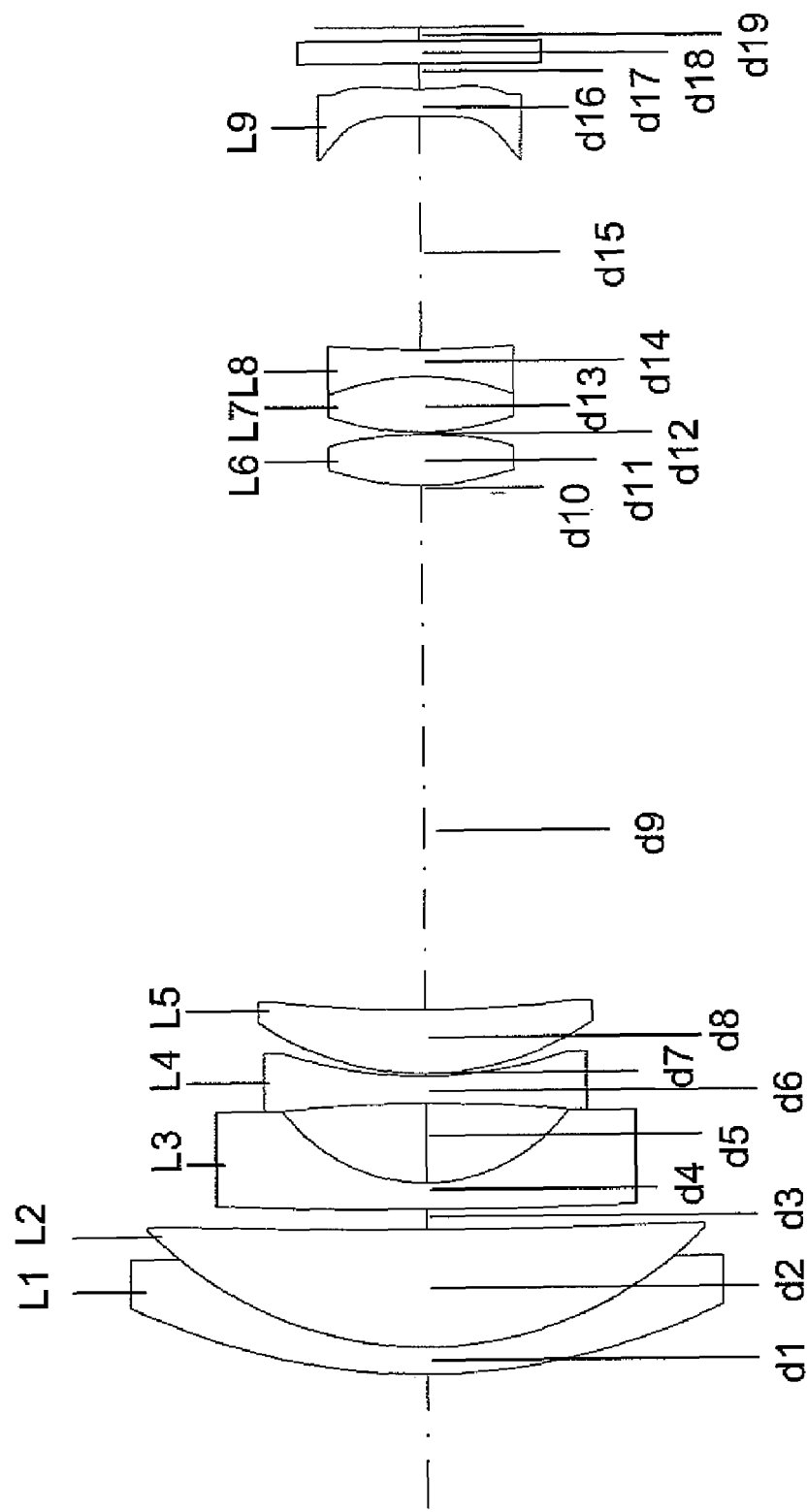
FIG. 1 schematically depicts in section of locations of all lenses of a zoom lens system according to the invention.

Referring to FIG. 1, a zoom lens system in accordance with the invention is shown. The zoom lens system comprises 9 lenses divided into a front first lens group G1, an intermediate second lens group G2, and a rear third lens group G3. The first lens group G1 is of positive diopter, the second lens group G2 is of negative diopter, and the third lens group G3 is of positive diopter. Position of the first lens group G1 of positive diopter is fixed during zooming and focusing. The second lens group G2 that is moved along the optical axis to correct any shift in the focal position due to zooming. The third lens group G3 that is moved for zooming along the optical axis. The first lens group G1 comprises a first lens L1 of divergent meniscus and a second lens L2 of plano-convex. The second lens group G2 comprises a third lens L3 of plano-concave, a fourth lens L4 of plano-concave, and a fifth lens L5 of plano-convex. The third lens group G3 comprises a sixth lens L6 of double-convex, a seventh lens L7 of double-convex, an eighth lens L8 of plano-concave, and a ninth lens L9 of plano-concave.

Preferably, the sixth and the ninth lenses L6, L9 are non-spherical lenses formed of a plastic material. The remaining lenses are conventional glass lenses so as to reduce the production cost. The invention can be made compact and has improved image quality because the non-spherical lenses (particularly the ninth lens L9) can greatly decrease aberration beyond the optical axis. Lenses are designated by reference numerals L1 to L9 and distances of the lenses with respect to a reference point along the optical axis are designated by reference numerals d1 to d19. Preferably, the fifth and sixth lenses are formed as a single lens by applying adhesive therebetween. Hence, there is no distance between the fifth and sixth lenses so as to facilitate assembly.

The zoom lens system of the invention satisfies the following conditions:

$$0.16 < f_w/f_1 < 0.21 \tag{a}$$

$$-0.78 < f_w/f_2 < -0.64 \tag{b}$$

$$0.70 < f_w/f_3 < 0.75 \tag{c}$$

$$0.47 < \log Z_3/\log Z < 0.76 \tag{d}$$

where $f_w$ is a focal length of the overall system at a wide angle end, $f_1$ is a focal length of the first lens group, $f_2$ is a focal length of the second lens group, $f_3$ is a focal length of the third lens group, Z is the change ratio of magnification of the overall system, $Z_3$ is a change ratio ($Z_3$=m3t/m3w) of magnification of the third lens group, m3t is a lateral magnification of the third lens group at a telescopic end, and m3w is a lateral magnification of the third lens group at a wide angle end.

FIRST EMBODIMENT

Figure 2A:
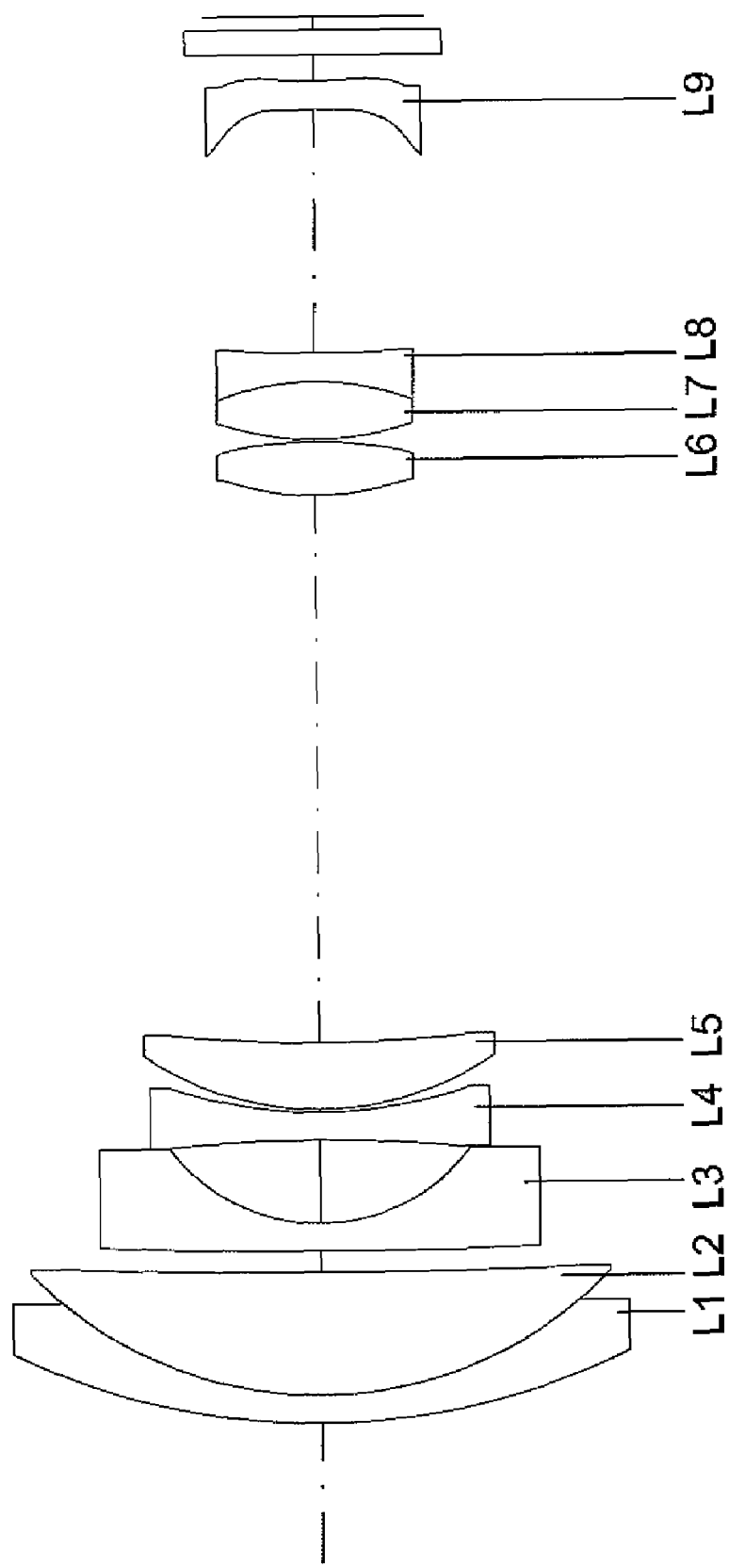
FIG. 2A schematically depicts in section of locations of the lenses of FIG. 1 at the wide angle end according to a first preferred embodiment of the invention.
Figure 2B:
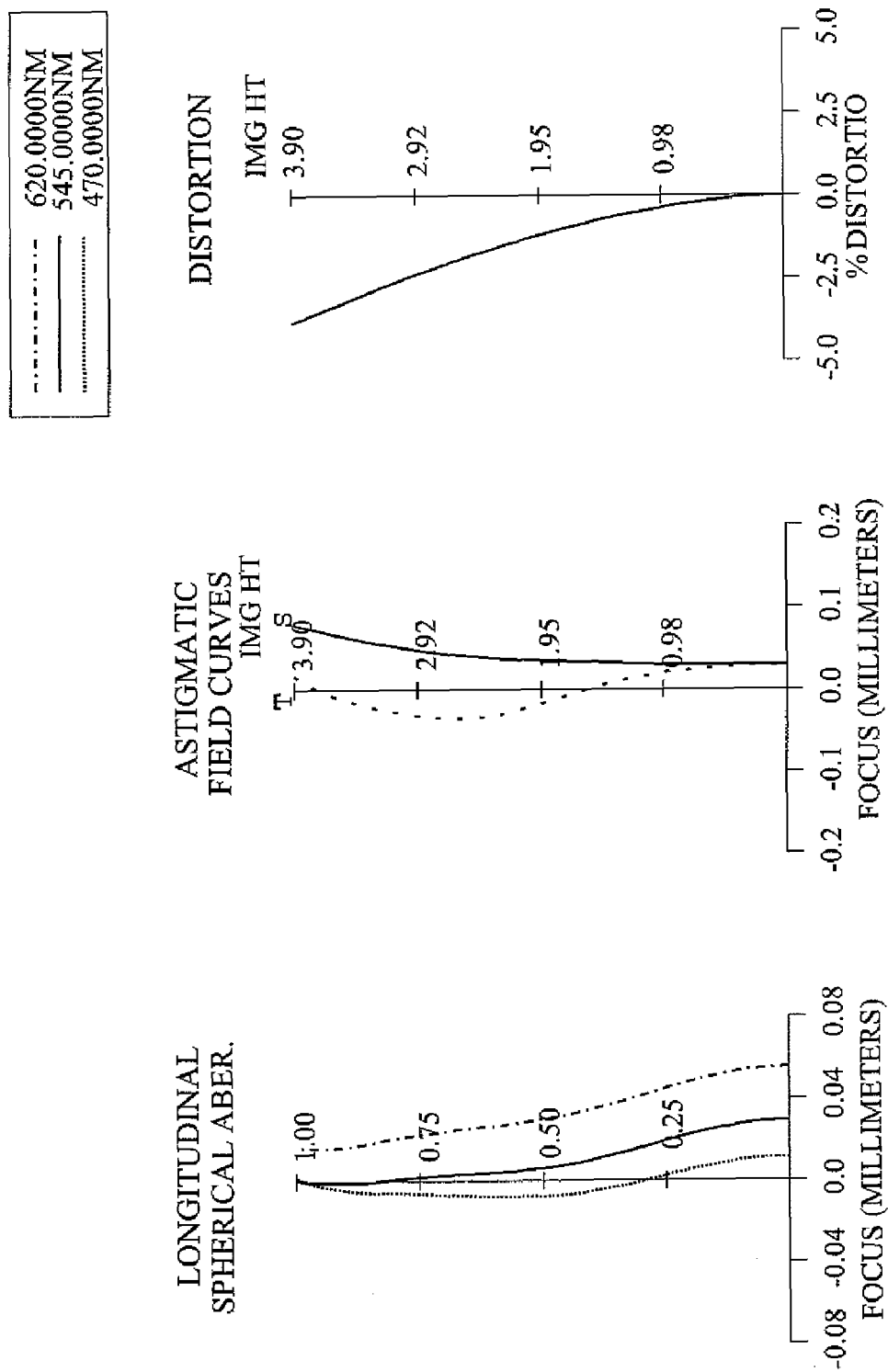
FIG. 2B plots curves of longitudinal spherical aberration versus focal length, astigmatic field curves versus focal length, and a curve of distortion versus focal length according to the first preferred embodiment at the wide angle end respectively.
Figure 2C:
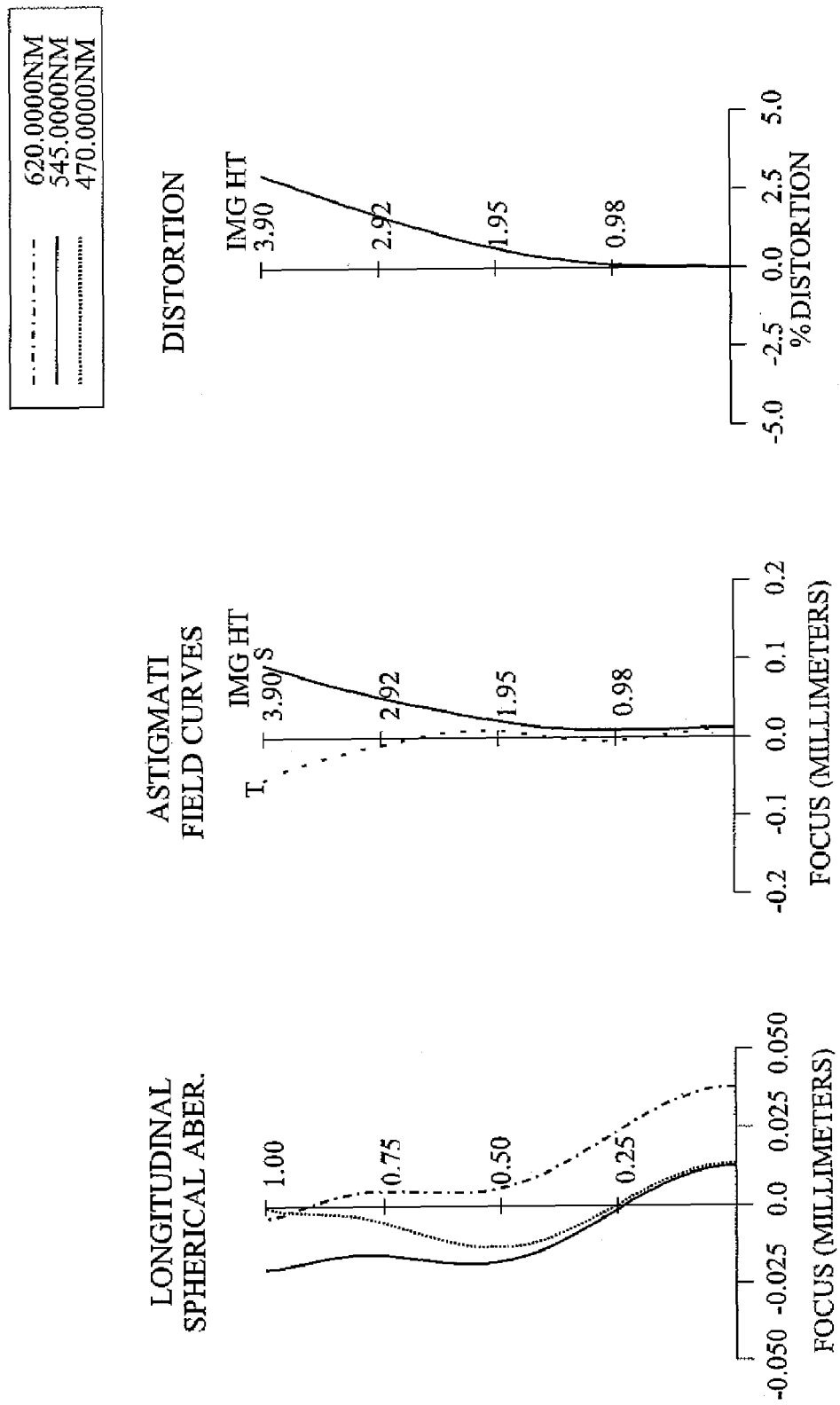
FIG. 2C plots curves of longitudinal spherical aberration versus focal length, astigmatic field curves versus focal length, and a curve of distortion versus focal length according to the first preferred embodiment at the intermediate focal length respectively.
Figure 2D:
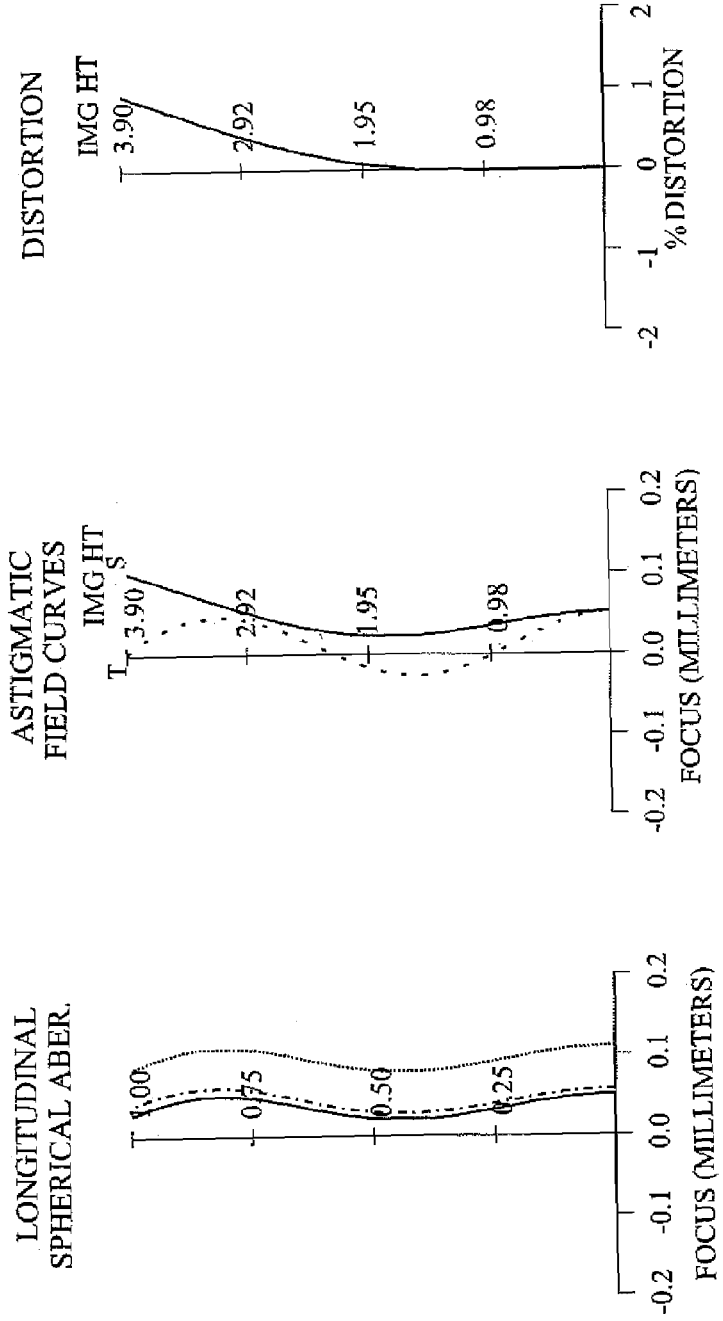
FIG. 2D plots curves of longitudinal spherical aberration versus focal length, astigmatic field curves versus focal length, and a curve of distortion versus focal length according to the first preferred embodiment at the narrow angle end respectively.
Figure 3A:
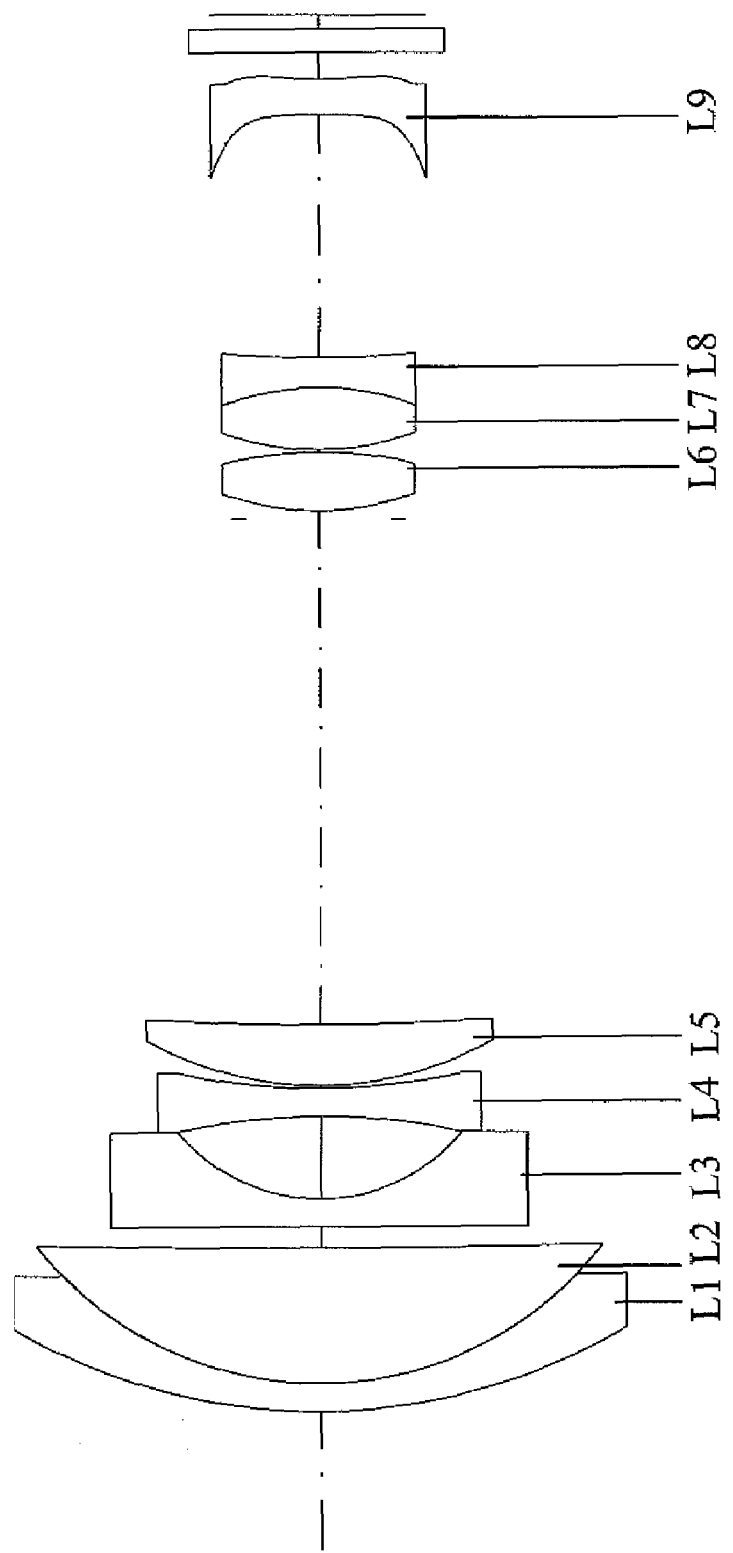
FIG. 3A schematically depicts in section of locations of the lenses of FIG. 1 at the wide angle end according to a second preferred embodiment of the invention.
Figure 3B:
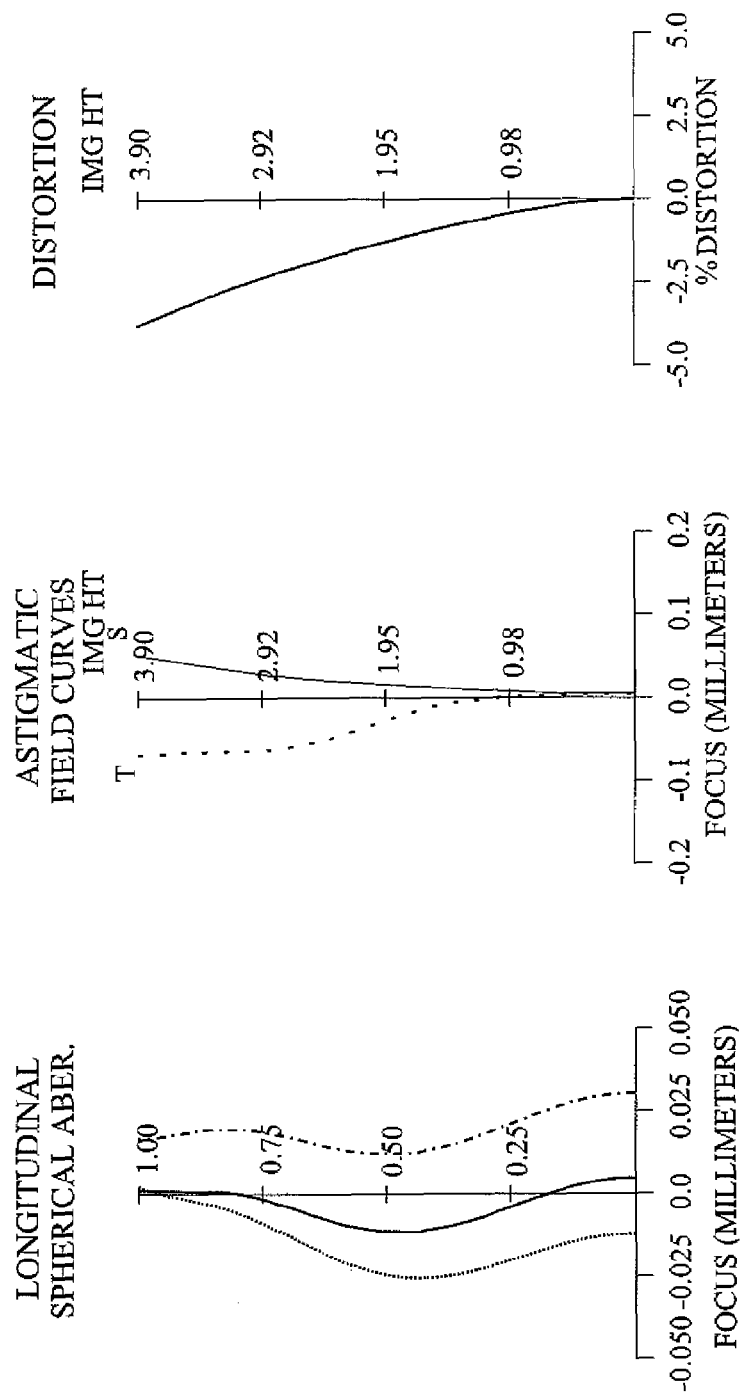
FIG. 3B plots curves of longitudinal spherical aberration versus focal length, astigmatic field curves versus focal length, and a curve of distortion versus focal length according to the second preferred embodiment at the wide angle end respectively.
Figure 3C:
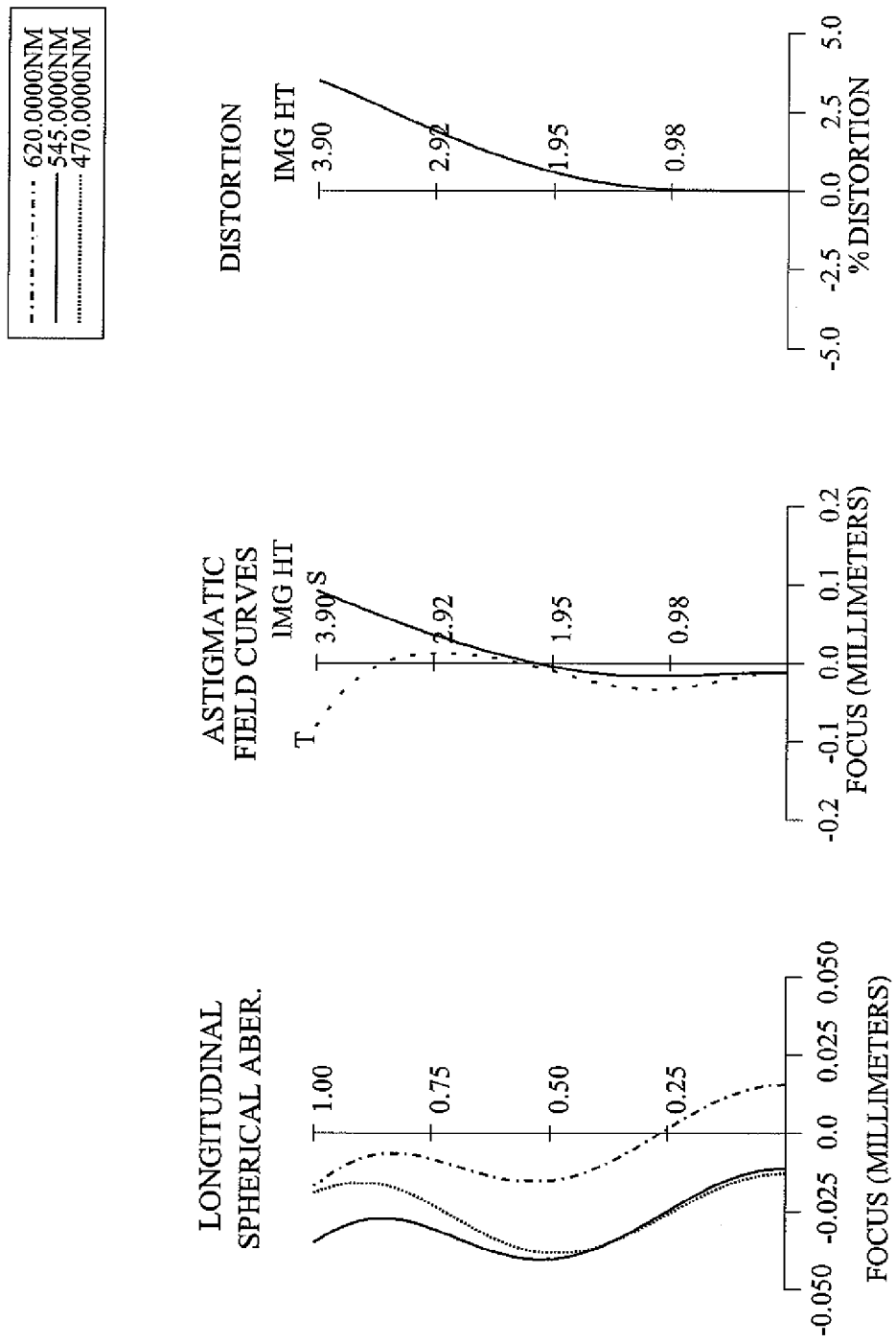
FIG. 3C plots curves of longitudinal spherical aberration versus focal length, astigmatic field curves versus focal length, and a curve of distortion versus focal length according to the second preferred embodiment at the intermediate focal length respectively.
Figure 3D:
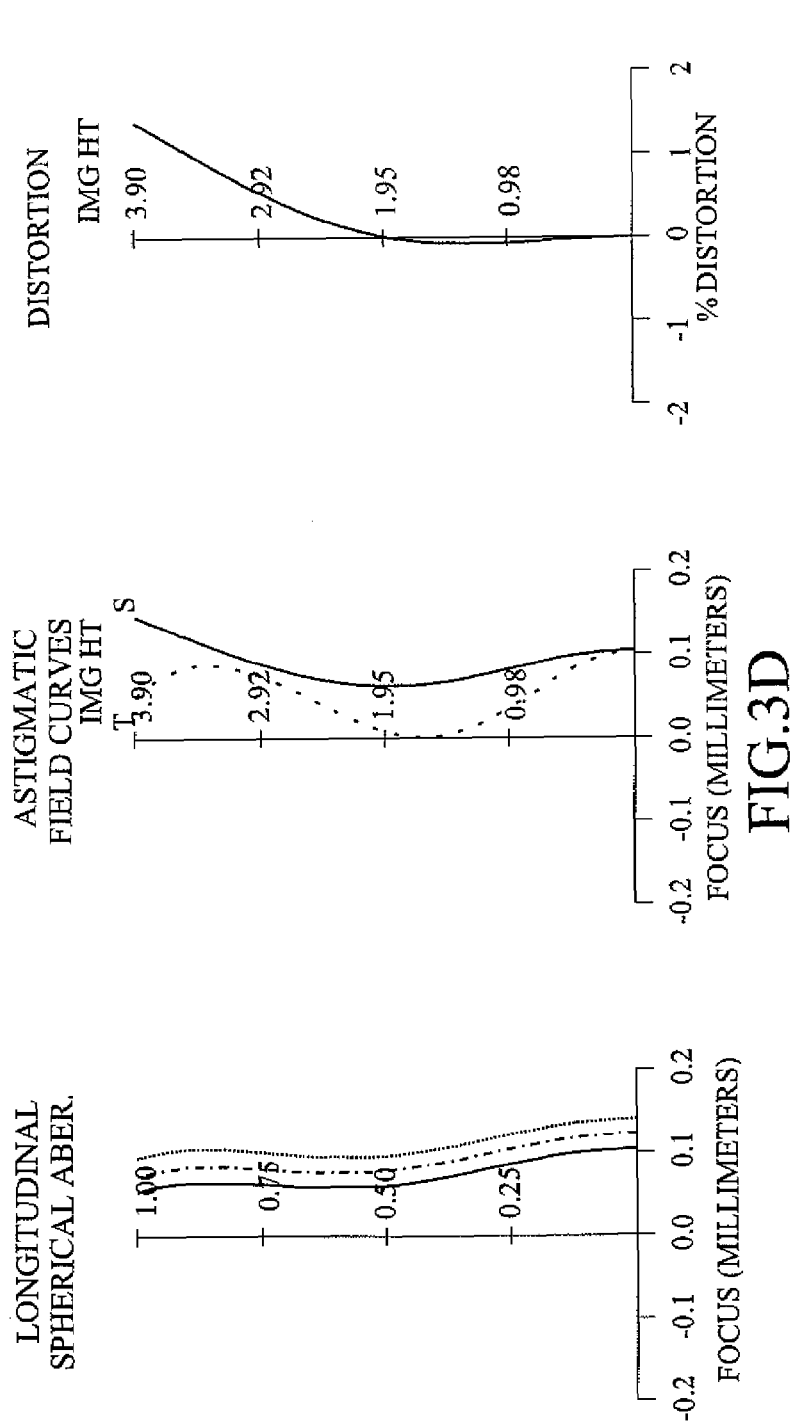
FIG. 3D plots curves of longitudinal spherical aberration versus focal length, astigmatic field curves versus focal length, and a curve of distortion versus focal length according to the second preferred embodiment at the narrow angle end respectively.
Figure 4A:
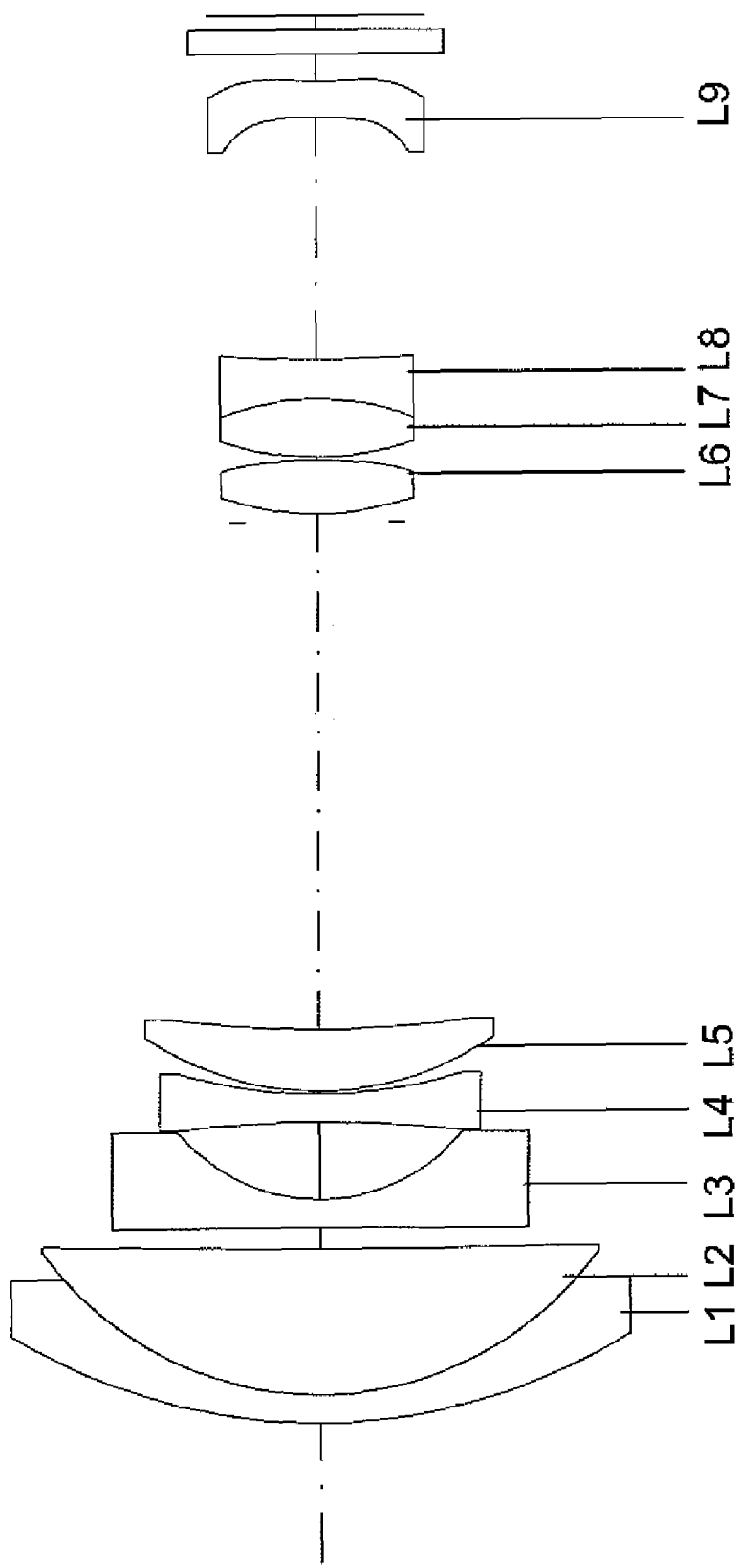
FIG. 4A schematically depicts in section of locations of the lenses of FIG. 1 at the wide angle end according to a third preferred embodiment of the invention.
Figure 4B:
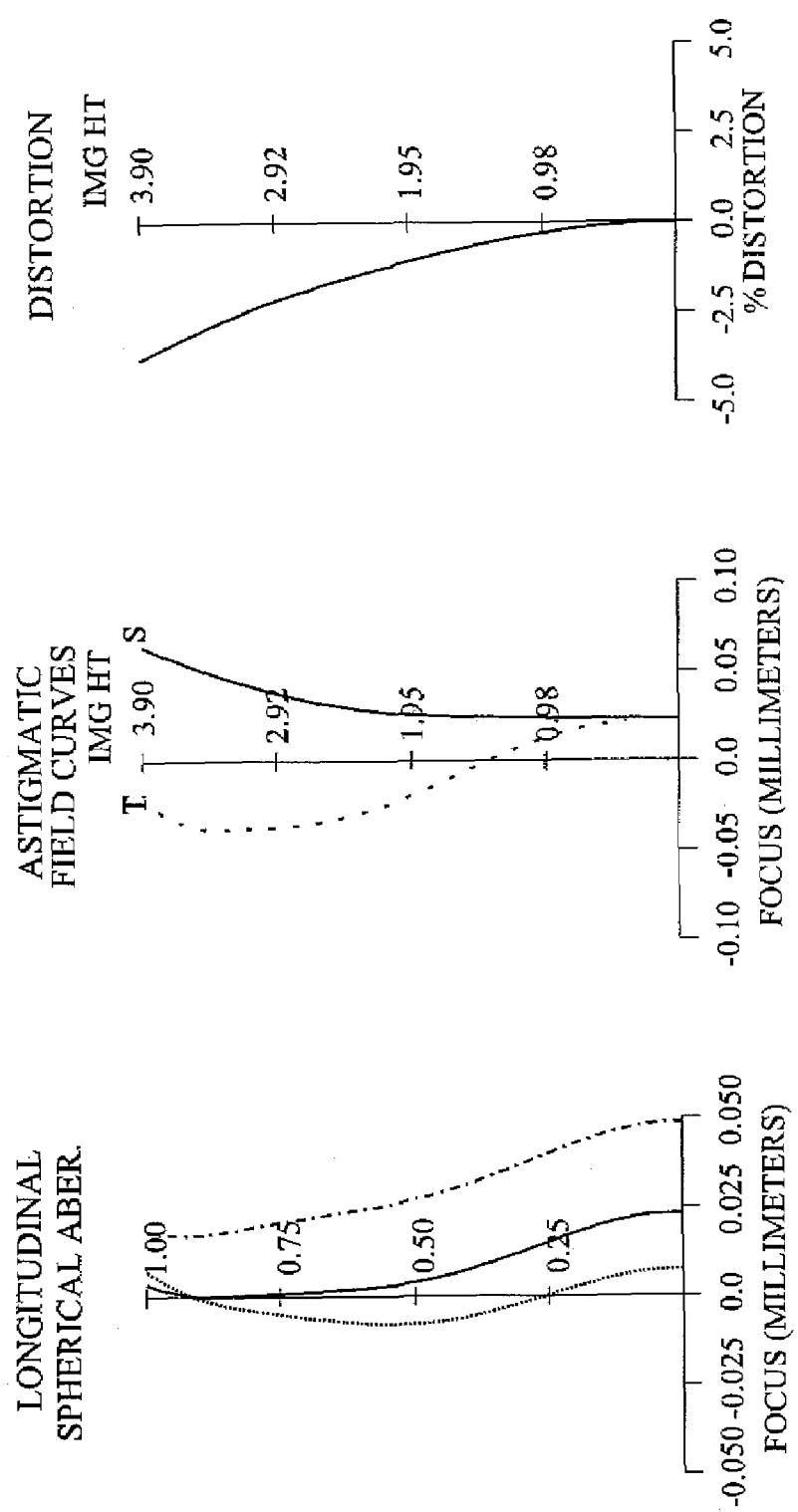
FIG. 4B plots curves of longitudinal spherical aberration versus focal length, astigmatic field curves versus focal length, and a curve of distortion versus focal length according to the third preferred embodiment at the wide angle end respectively.
Figure 4C:
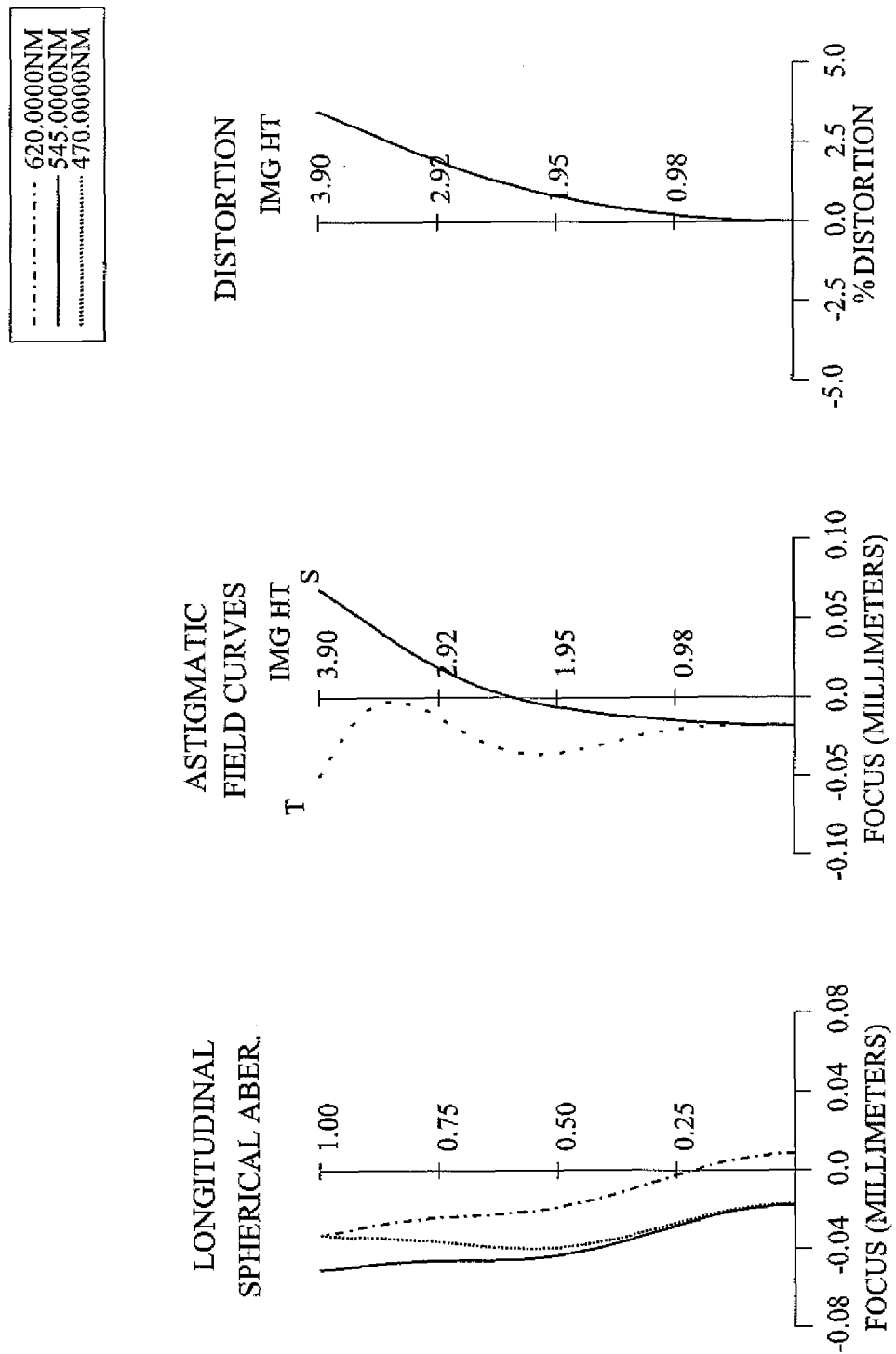
FIG. 4C plots curves of longitudinal spherical aberration versus focal length, astigmatic field curves versus focal length, and a curve of distortion versus focal length according to the third preferred embodiment at the intermediate focal length respectively.
Figure 4D:
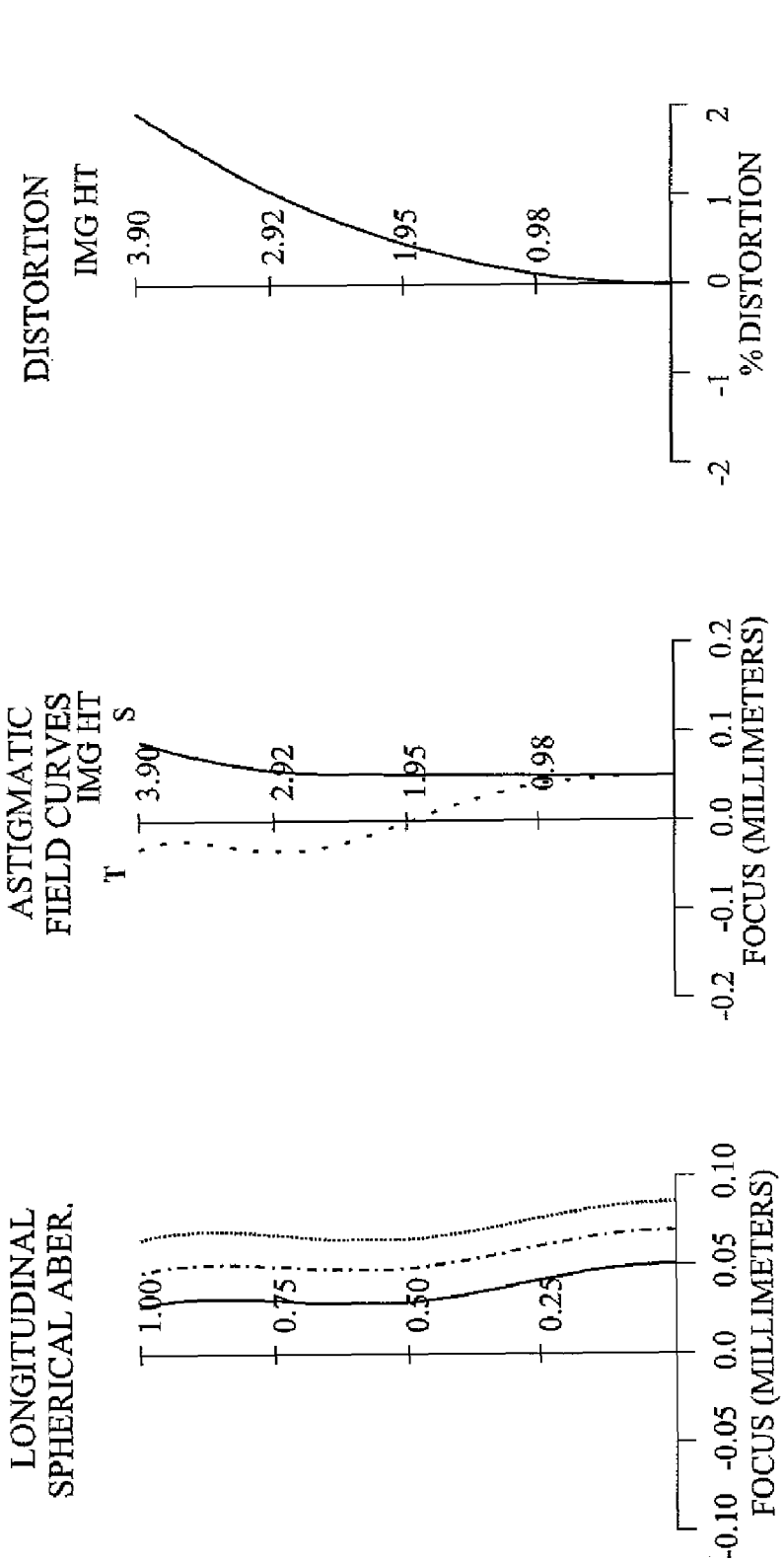
FIG. 4D plots curves of longitudinal spherical aberration versus focal length, astigmatic field curves versus focal length, and a curve of distortion versus focal length according to the third preferred embodiment at the narrow angle end respectively.
Figure 5A:
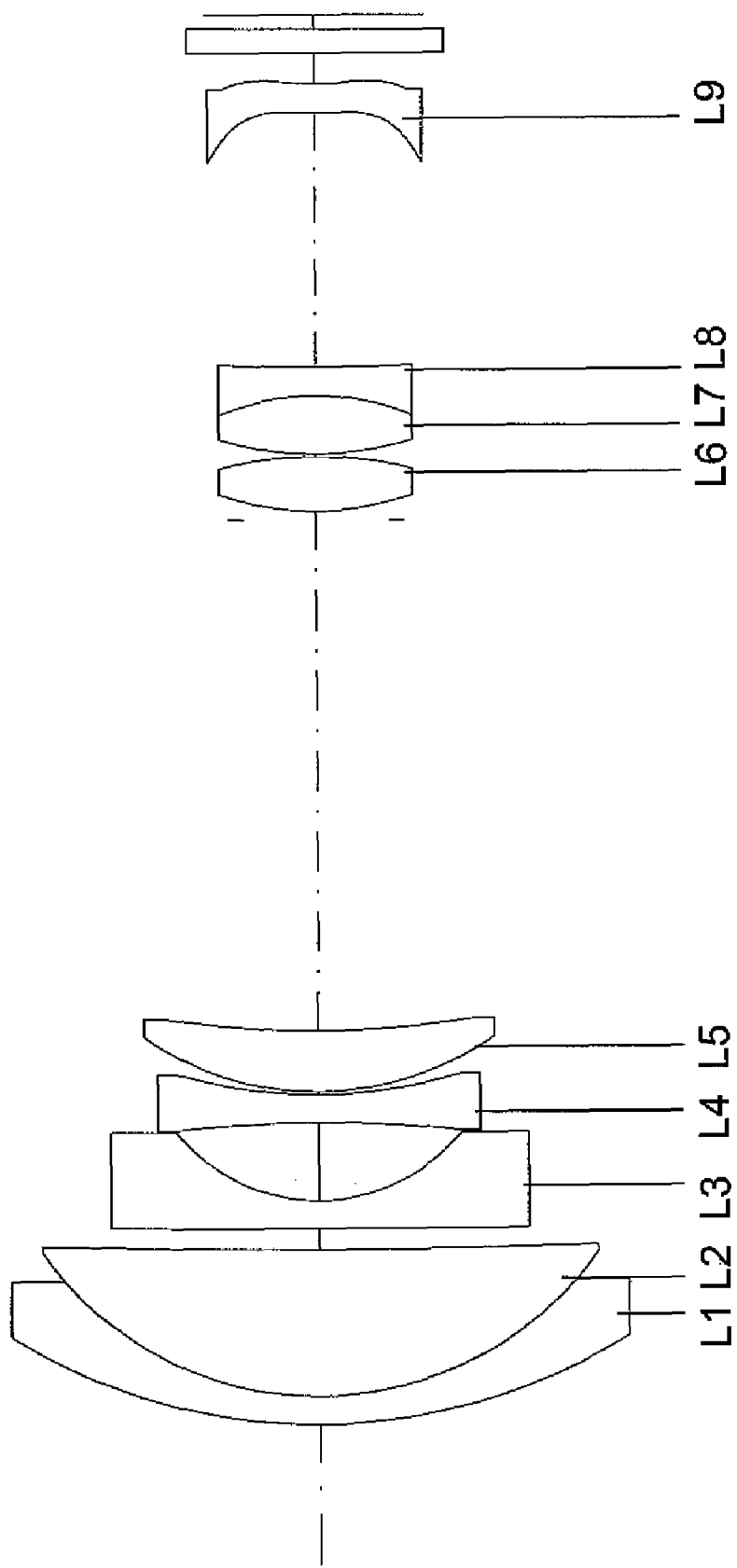
FIG. 5A schematically depicts in section of locations of the lenses of FIG. 1 at the wide angle end according to a fourth preferred embodiment of the invention.
Figure 5B:
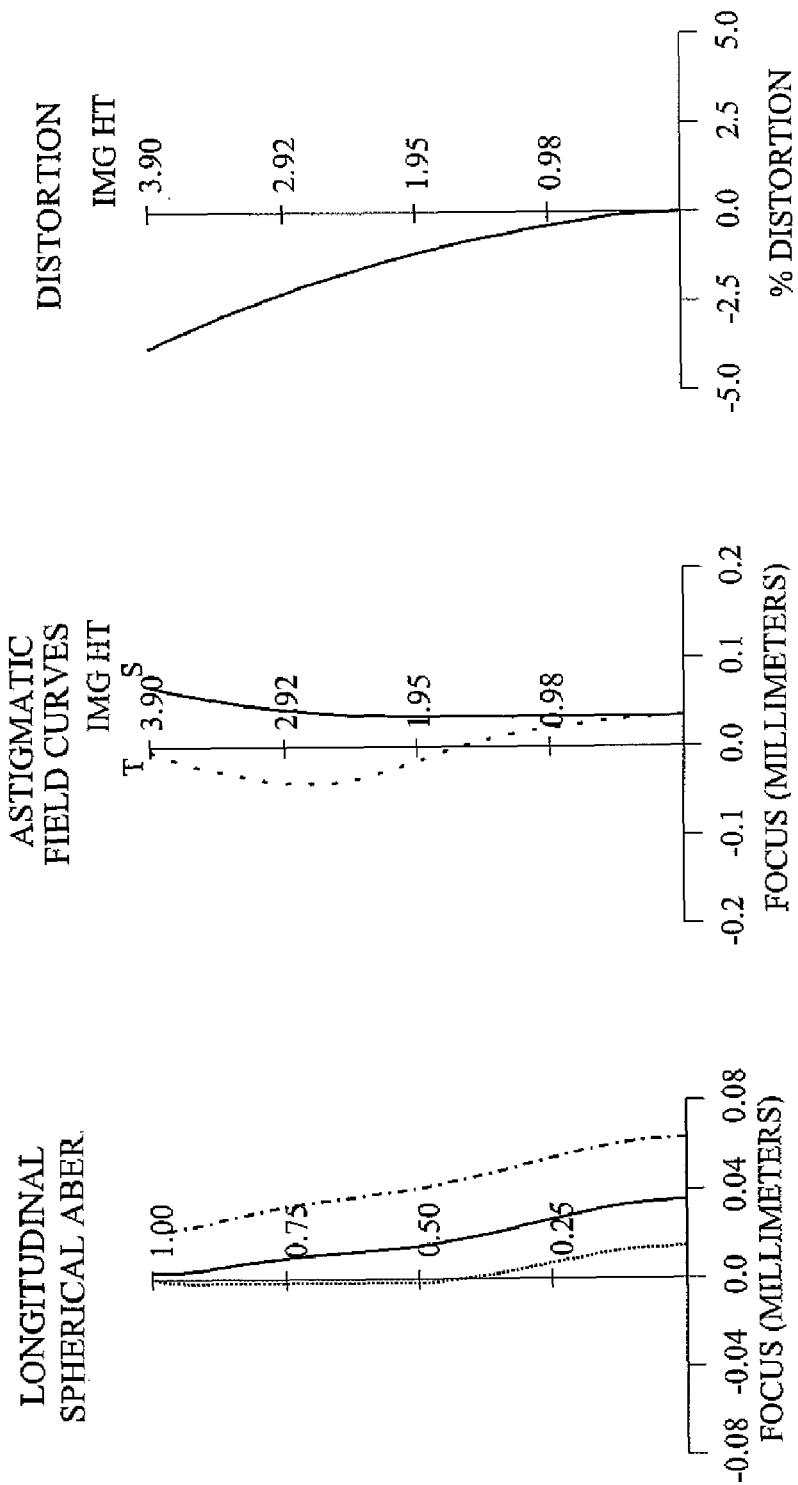
FIG. 5B plots curves of longitudinal spherical aberration versus focal length, astigmatic field curves versus focal length, and a curve of distortion versus focal length according to the fourth preferred embodiment at the wide angle end respectively.
Figure 5C:
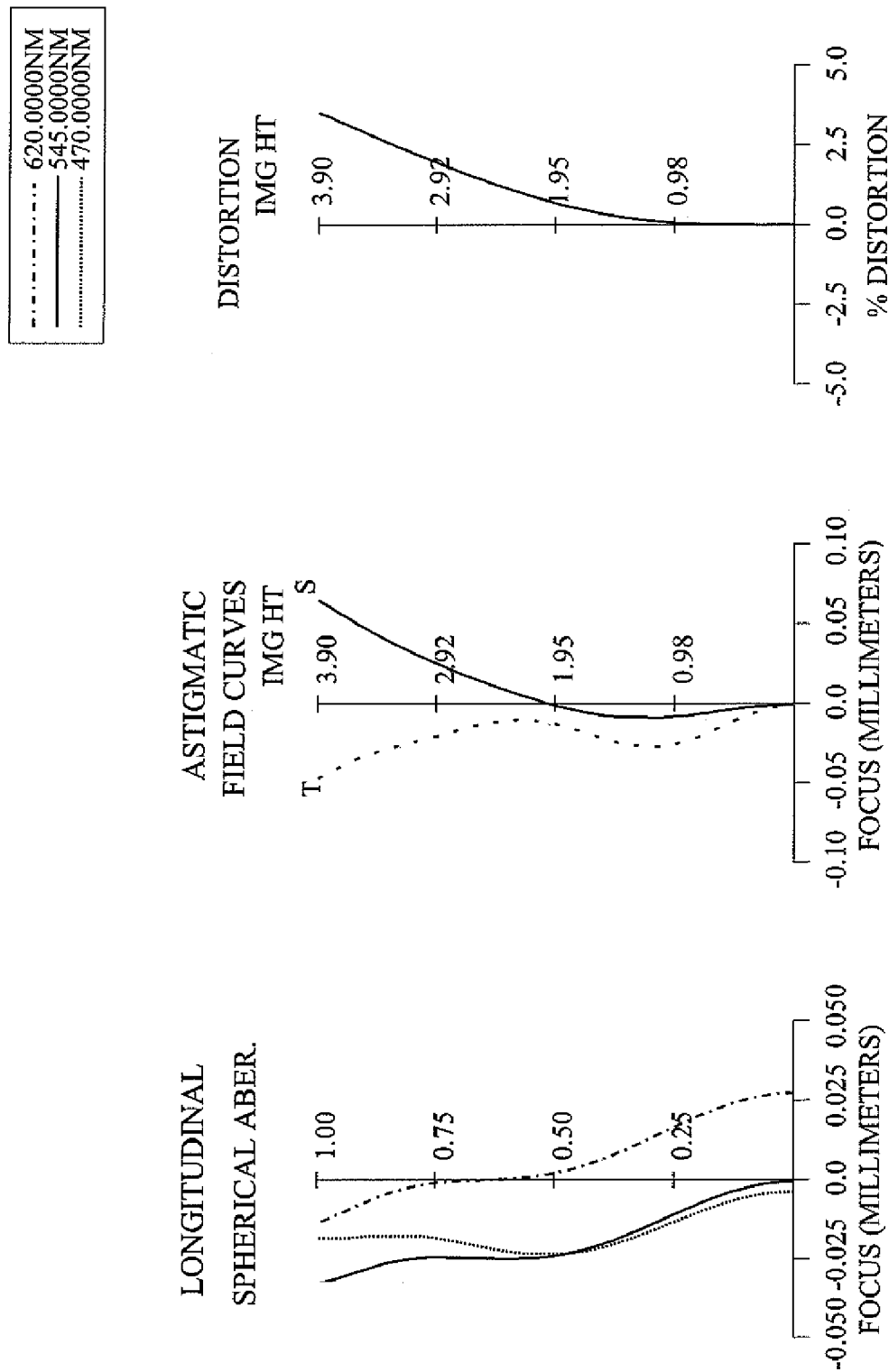
FIG. 5C plots curves of longitudinal spherical aberration versus focal length, astigmatic field curves versus focal length, and a curve of distortion versus focal length according to the fourth preferred embodiment at the intermediate focal length respectively.
Figure 5D:
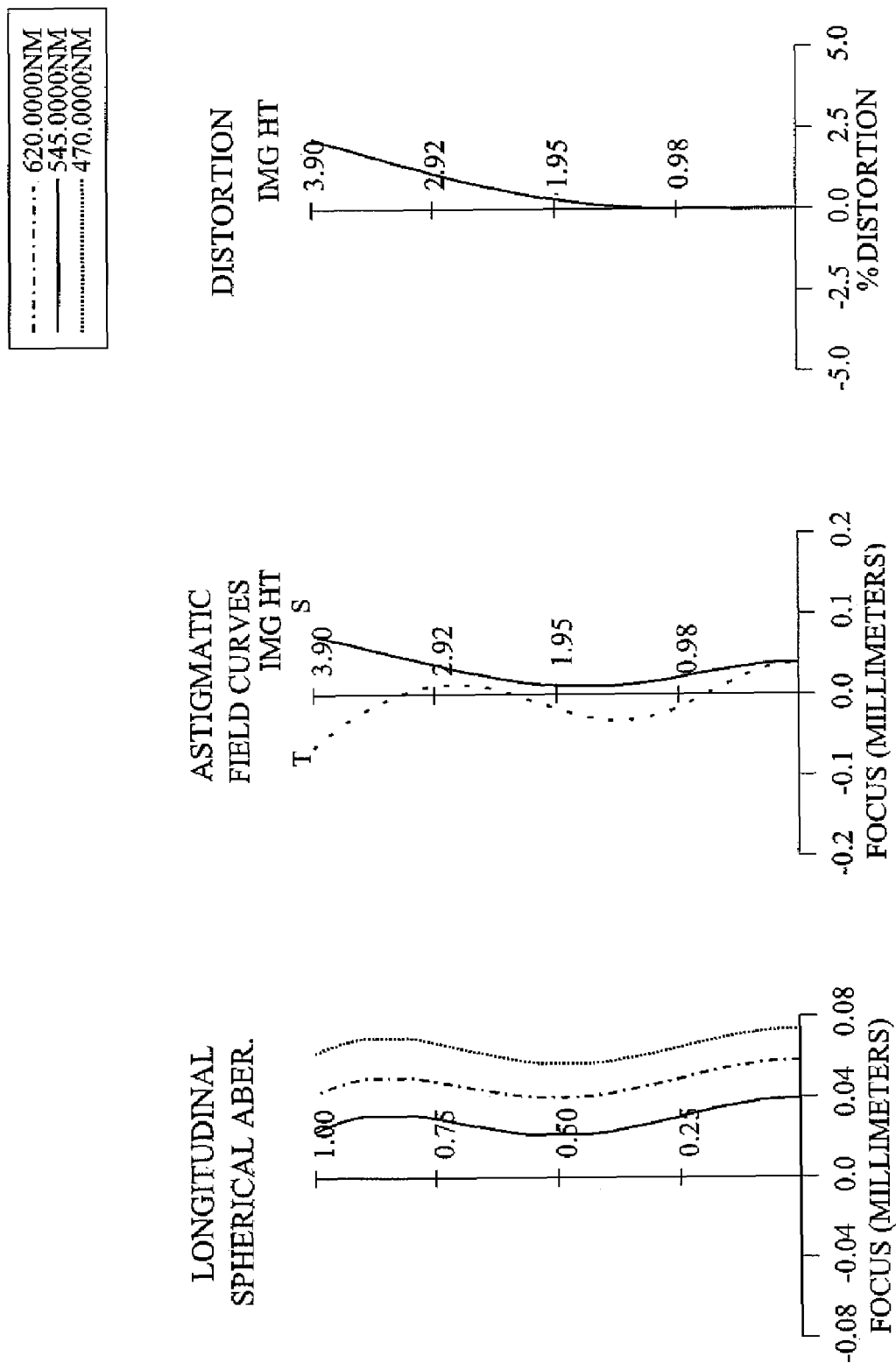
FIG. 5D plots curves of longitudinal spherical aberration versus focal length, astigmatic field curves versus focal length, and a curve of distortion versus focal length according to the fourth preferred embodiment at the narrow angle end respectively.
Figure 6A:
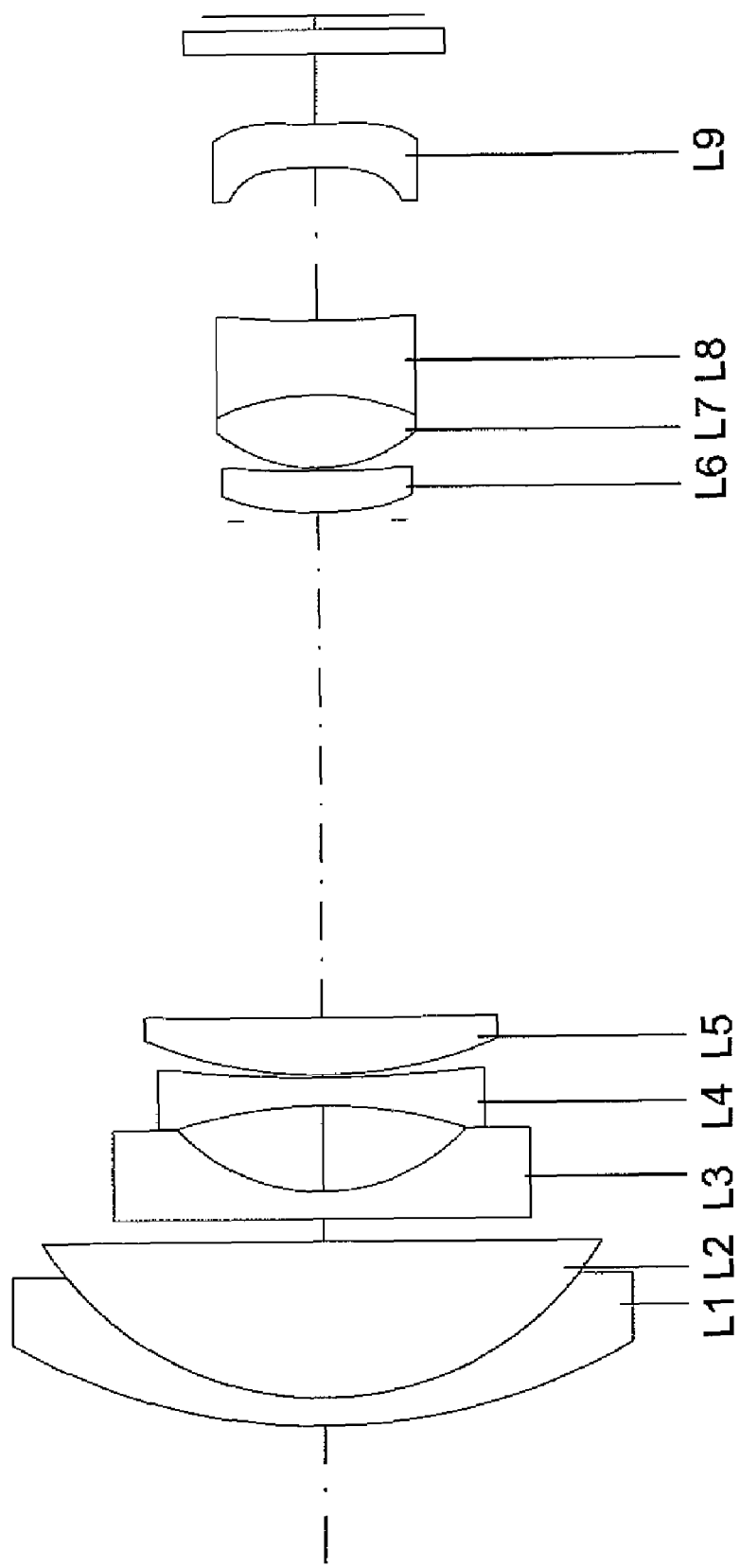
FIG. 6A schematically depicts in section of locations of the lenses of FIG. 1 at the wide angle end according to a fifth preferred embodiment of the invention.
Figure 6B:
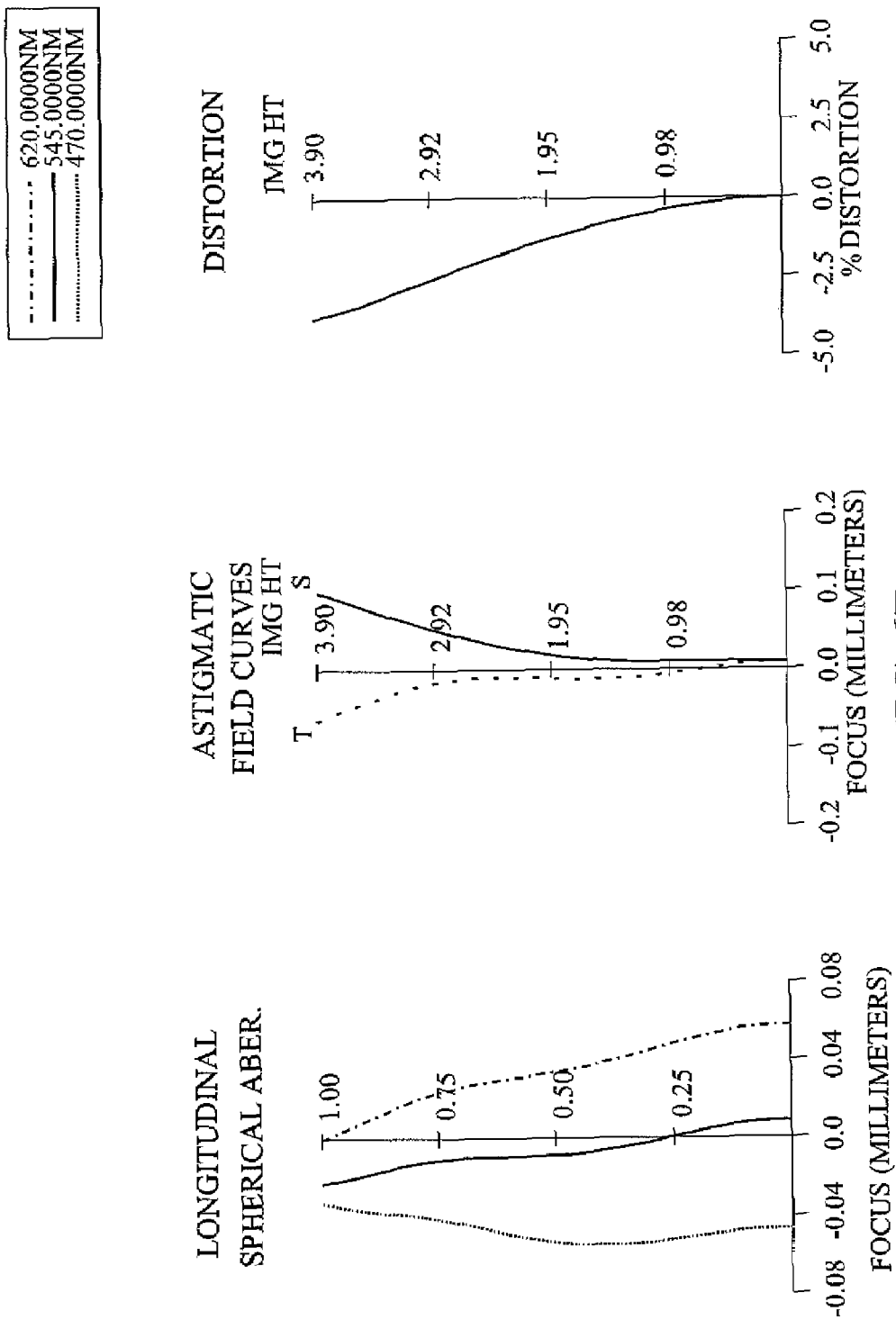
FIG. 6B plots curves of longitudinal spherical aberration versus focal length, astigmatic field curves versus focal length, and a curve of distortion versus focal length according to the fifth preferred embodiment at the wide angle end respectively.
Figure 6C:
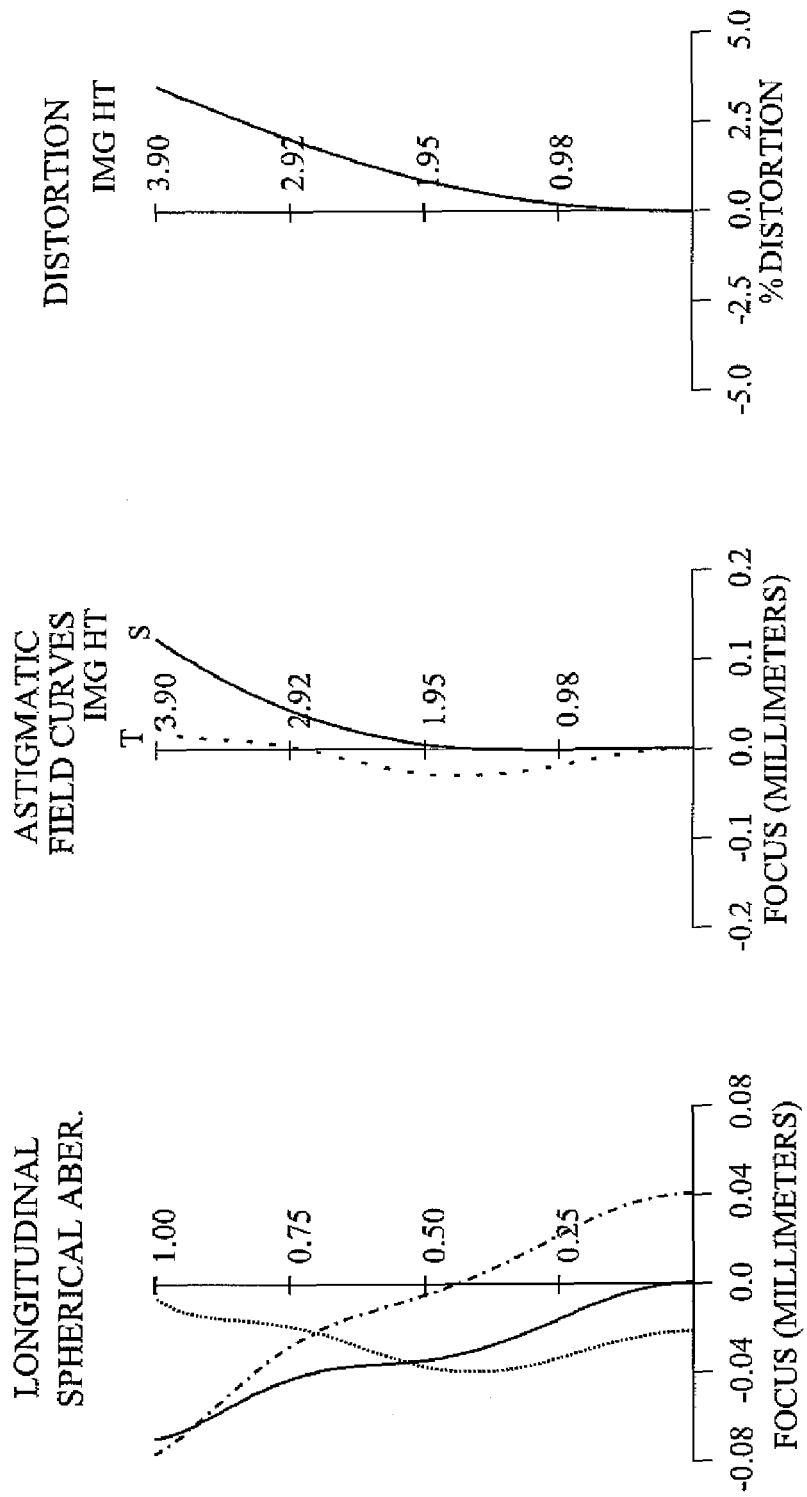
FIG. 6C plots curves of longitudinal spherical aberration versus focal length, astigmatic field curves versus focal length, and a curve of distortion versus focal length according to the fifth preferred embodiment at the intermediate focal length respectively.
Figure 6D:
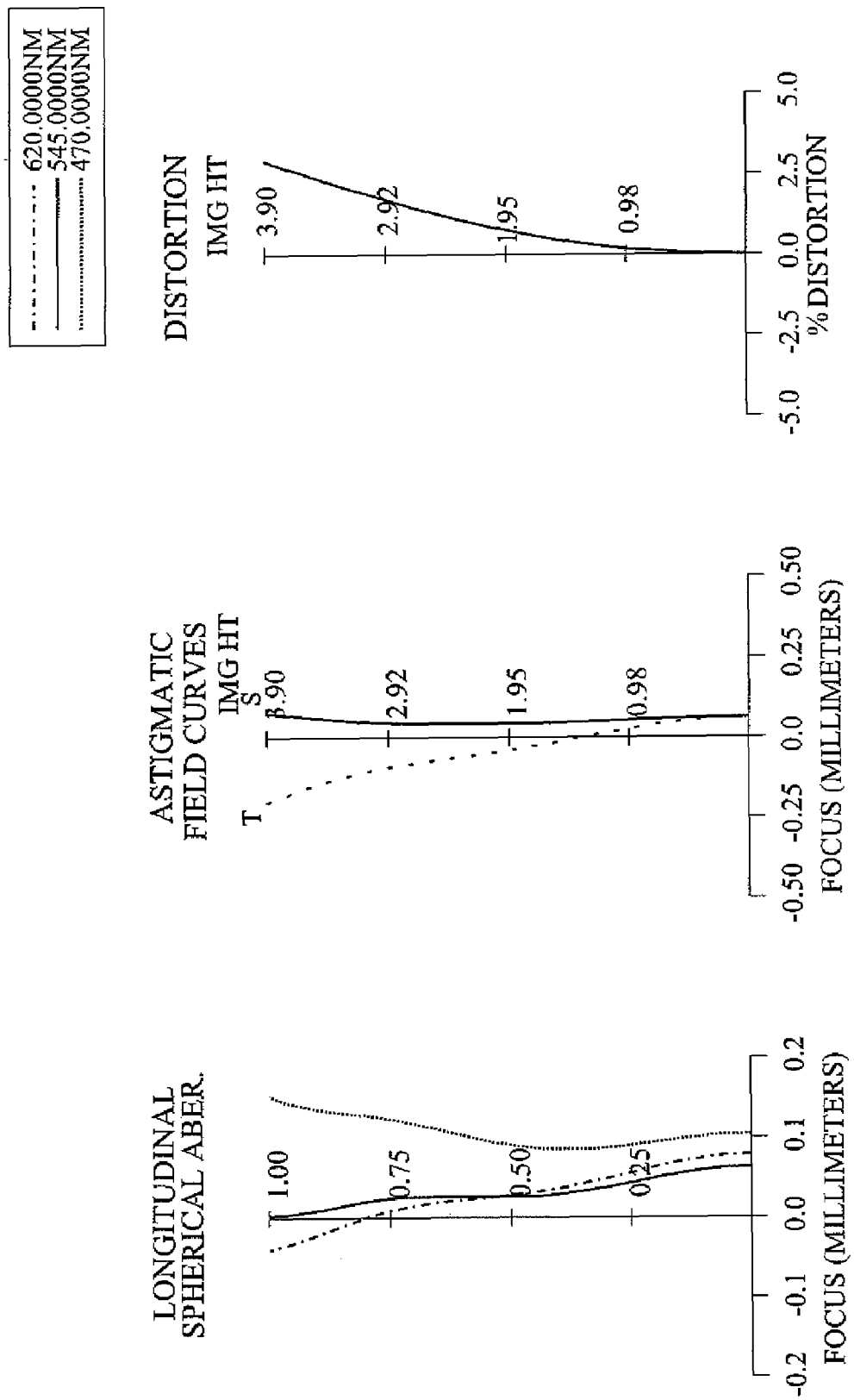
FIG. 6D plots curves of longitudinal spherical aberration versus focal length, astigmatic field curves versus focal length, and a curve of distortion versus focal length according to the fifth preferred embodiment at the narrow angle end respectively.

Referring to FIGS. 2A to 2D, a zoom lens system in accordance with a first preferred embodiment of the invention is shown. FIG. 2A is similar to FIG. 1 except minor changes in the shapes and distances of the non-spherical lenses and numerals d1 to d19 are eliminated. The exceptions are also applied to second to fifth preferred embodiments of the invention as detailed later.

Initial optical data of the first embodiment is Fno=1:3.22-6.84, f=6.60-32.34, and w=30.6°-6.8° where Fno is the diameter of aperture at the wide angle end or at the narrow angle end, f is the focal length of the overall system at the wide angle end or at the narrow angle end, and w is half view angle at the wide angle end or the narrow angle end. Specific numerical examples are shown in the following Table I in which r is the radius of curvature, n is the refractive index, and v is Abbe number which represents a value of chromatic aberration of a material, and v is inversely proportional to the value of chromatic aberration.

TABLE 1

| Surface | r | d | n | v |
|---|---|---|---|---|
| 1 | 24.892 | 1.00 | 1.84666 | 23.8 |
| 2 | 14.249 | 4.38 | 1.73550 | 45.5 |
| 3 | 248.792 | d3 | | |
| 4 | 175.679 | 1.00 | 1.74563 | 41.0 |
| 5 | 6.628 | 2.97 | | |
| 6 | −54.047 | 1.00 | 1.64490 | 55.9 |
| 7 | 16.466 | 0.10 | | |
| 8 | 11.028 | 2.37 | 1.84666 | 23.8 |
| 9 | 47.662 | d9 | | |
| STO | INFINITY | 0.30 | | |
| 11 | A(1) | 1.89 | 1.52540 | 56.3 |
| 12 | A(2) | 0.10 | | |
| 13 | 10.709 | 2.04 | 1.49348 | 69.7 |
| 14 | −9.321 | 1.00 | 1.75404 | 28.7 |
| 15 | 41.150 | 8.64 | | |
| 16 | A(3) | 1.00 | 1.52540 | 56.3 |
| 17 | A(4) | d17 | | |
| >18 | INFINITY | 0.85 | 1.51680 | 64.2 |
| 19 | INFINITY | 0.50 | | |
| IMG | INFINITY | 0.00 | | |

Among the lens group, the eleventh, the twelfth, the sixteenth, and the seventeenth lenses are non-spherical lens and data of the non-spherical coefficient is detailed below.

| ASPHERIC | CURV | K | A | B | C | D |
|---|---|---|---|---|---|---|
| A(1) | 0.10869565 | 1.879500 | −5.47316E−04 | −3.22636E−05 | 1.47530E−06 | −2.22694E−07 |
| A(2) | −0.05852651 | 19.382921 | 2.48007E−04 | 1.09731E−05 | −9.27014E−07 | 5.70812E−08 |
| A(3) | 0.02866884 | 30.000000 | −1.33283E−02 | 9.11725E−04 | −1.12843E−04 | 4.89892E−06 |
| A(4) | 0.12612779 | −30.000000 | −6.57065E−03 | 2.83006E−04 | −2.44049E−05 | 1.00207E−06 |

Variables d3, d9, and d17 have the following data when the focal length changes:

| | Z1 | Z2 | Z3 |
|---|---|---|---|
| Fno | 3.22 | 4.80 | 6.84 |
| f | 6.60 | 19.80 | 32.34 |
| w | 30.6 | 11.1 | 6.8 |
| d3 | 0.75 | 10.32 | 9.63 |
| d9 | 19.15 | 5.85 | 1.22 |
| d17 | 0.95 | 4.66 | 10.00 |

Changes of the non-spherical lens along radius can be expressed in the following equation:

$$Z = \frac{(curv)Y^2}{1 + (1 - (1+K)(curv)^2 Y^2)} + (A)Y^4 + (B)Y^6 + (C)Y^8 + (D)Y^{10}$$

where Z is the amount of sag, curv is the radius of curvature, K is the second curvature constant, Y is the height of the lens with respect to the optical axis, A is fourth non-spherical coefficient, B is sixth non-spherical coefficient, C is eighth non-spherical coefficient, and D is tenth non-spherical coefficient.

SECOND EMBODIMENT

Referring to FIGS. 3A to 3D, a zoom lens system in accordance with a second preferred embodiment of the invention is shown. Initial optical data of the second embodiment is Fno=1.3.30-6.61, f=6.80-33.32, and w=29.8°-6.6° where Fno is the diameter of aperture at the wide angle end or at the narrow angle end, f is the focal length of the overall system at the wide angle end or at the narrow angle end, and w is half view angle at the wide angle end or the narrow angle end. Specific numerical examples are shown in the following Table 2 in which r is the radius of curvature, d is an axial distance between any two lenses, n is the refractive index, and v is Abbe number.

TABLE 2

| Surface | r | d | n | v |
|---|---|---|---|---|
| 1 | 21.538 | 1.00 | 1.84666 | 23.8 |
| 2 | 12.764 | 4.87 | 1.71105 | 46.7 |
| 3 | 495.195 | d3 | | |
| 4 | −10714.264 | 1.00 | 1.74397 | 44.9 |
| 5 | 6.593 | 2.98 | | |
| 6 | −23.621 | 1.00 | 1.64283 | 56.2 |
| 7 | 23.894 | 0.10 | | |
| 8 | 12.647 | 2.19 | 1.84666 | 23.8 |
| 9 | 87.764 | d9 | | |
| STO | INFINITY | 0.30 | | |
| 11 | A(1) | 2.09 | 1.49176 | 57.5 |
| 12 | A(2) | 0.10 | | |
| 13 | 10.430 | 2.22 | 1.50434 | 68.6 |
| 14 | −9.786 | 1.07 | 1.75450 | 28.2 |
| 15 | 41.153 | 8.65 | | |
| 16 | A(3) | 1.28 | 1.52540 | 56.3 |
| 17 | A(4) | d17 | | |
| >18 | INFINITY | 0.85 | 1.51680 | 64.2 |
| 19 | INFINITY | 0.50 | | |
| IMG | INFINITY | 0.00 | | |

Among the lens group, the eleventh, the twelfth, the sixteenth, and the seventeenth lenses are non-spherical lens and data of the non-spherical coefficient is detailed below.

| ASPHERIC | CURV | K | A | B | C | D |
|---|---|---|---|---|---|---|
| A(1) | 0.10869565 | 1.874293 | −5.35248E−04 | −3.48059E−05 | 1.88700E−06 | −1.95216E−07 |
| A(2) | −0.05987199 | 16.548338 | 2.42914E−04 | 9.52049E−06 | −1.16017E−06 | 6.67097E−08 |
| A(3) | 0.03225878 | −30.000000 | −1.06596E−02 | 6.38886E−04 | −7.21983E−05 | 1.93232E−06 |
| A(4) | 0.12247190 | −30.000000 | −5.21235E−03 | 2.21202E−04 | −2.07952E−05 | 6.37336E−07 |

Variables d3, d9, and d17 have the following data when the focal length changes:

|     | Z1    | Z2    | Z3    |
|-----|-------|-------|-------|
| Fno | 3.30  | 4.71  | 6.61  |
| f   | 6.80  | 20.40 | 33.32 |
| w   | 29.8  | 10.8  | 6.6   |
| d3  | 0.76  | 9.76  | 11.04 |
| d9  | 18.10 | 5.88  | 1.20  |
| d17 | 0.95  | 4.17  | 7.57  |

Variables d3, d9, and d17 have the following data when the focal length changes:

|     | Z1    | Z2    | Z3    |
|-----|-------|-------|-------|
| Fno | 3.30  | 4.72  | 6.60  |
| f   | 7.10  | 21.30 | 34.81 |
| w   | 28.8  | 10.3  | 6.3   |
| d3  | 0.75  | 9.63  | 11.55 |
| d9  | 18.01 | 5.94  | 1.23  |
| d17 | 0.98  | 4.18  | 6.97  |

THIRD EMBODIMENT

Referring to FIGS. 4A to 4D, a zoom lens system in accordance with a third preferred embodiment of the invention is shown. Initial optical data of the third embodiment is Fno=1:3.30-6.60, f=7.10-34.81, and w=28.8°-6.3° where Fno is the diameter of aperture at the wide angle end or at the narrow angle end, f is the focal length of the overall system at the wide angle end or at the narrow angle end, and w is half view angle at the wide angle end or the narrow angle end. Specific numerical examples are shown in the following Table 3 in which r is the radius of curvature, d is an axial distance between any two lenses, n is the refractive index, and v is Abbe number.

TABLE 3

| Surface | r        | d    | n       | v    |
|---------|----------|------|---------|------|
| 1       | 20.671   | 1.00 | 1.84666 | 23.8 |
| 2       | 12.062   | 5.22 | 1.70187 | 44.9 |
| 3       | 516.846  | d3   |         |      |
| 4       | -947.313 | 1.00 | 1.74397 | 44.9 |
| 5       | 6.560    | 2.76 |         |      |
| 6       | -43.364  | 1.00 | 1.63364 | 57.8 |
| 7       | 17.647   | 0.10 |         |      |
| 8       | 10.884   | 2.21 | 1.84666 | 23.8 |
| 9       | 39.017   | d9   |         |      |
| STO     | INFINITY | 0.30 |         |      |
| 11      | A(1)     | 1.92 | 149176  | 57.5 |
| 12      | A(2)     | 0.10 |         |      |
| 13      | 10.987   | 2.05 | 1.51840 | 67.3 |
| 14      | -9.880   | 1.40 | 1.75453 | 28.2 |
| 15      | 47.249   | 8.56 |         |      |
| 16      | A(3)     | 1.29 | 1.52540 | 56.3 |
| 17      | A(4)     | d17  |         |      |
| 18      | INFINITY | 0.85 | 1.51680 | 64.2 |
| 19      | INFINITY | 0.50 |         |      |
| IMG     | INFINITY | 0.00 |         |      |

Among the lens group, the eleventh, the twelfth, the sixteenth, and the seventeenth lenses are non-spherical lens and data of the non-spherical coefficient is detailed below.

FOURTH EMBODIMENT

Referring to FIGS. 5A to 5D, a zoom lens system in accordance with a fourth preferred embodiment of the invention is shown. Initial optical data of the fourth embodiment is Fno=1:3.39-6.18, f=7.19-35.22, and w=28.5°-6.3° where Fno is the diameter of aperture at the wide angle end or at the narrow angle end, f is the focal length of the overall system at the wide angle end or at the narrow angle end, and w is half view angle at the wide angle end or the narrow angle end. Specific numerical examples are shown in the following Table 4 in which r is the radius of curvature, d is an axial distance between any two lenses, n is the refractive index, and v is Abbe number.

TABLE 4

| Surface | r        | d    | n       | v    |
|---------|----------|------|---------|------|
| 1       | 20.610   | 1.00 | 1.84666 | 23.8 |
| 2       | 12.004   | 5.22 | 1.71287 | 44.9 |
| 3       | 279.417  | d3   |         |      |
| 4       | 730.209  | 1.00 | 1.74397 | 44.9 |
| 5       | 6.503    | 2.77 |         |      |
| 6       | -46.659  | 1.00 | 1.62041 | 60.3 |
| 7       | 17.598   | 0.10 |         |      |
| 8       | 10.781   | 2.18 | 1.84666 | 23.8 |
| 9       | 34.248   | d9   |         |      |
| STO     | INFINITY | 0.30 |         |      |
| 11      | A(1)     | 1.93 | 1.52540 | 56.3 |
| 12      | A(2)     | 0.10 |         |      |
| 13      | 11.581   | 2.07 | 1.48775 | 70.4 |
| 14      | -8.832   | 1.00 | 1.75347 | 29.3 |
| 15      | 57.678   | 9.02 |         |      |
| 16      | A(3)     | 1.00 | 1.49176 | 57.5 |
| 17      | A(4)     | d17  |         |      |
| 18      | INFINITY | 0.85 | 1.51680 | 64.2 |
| 19      | INFINITY | 0.50 |         |      |
| IMG     | INFINITY | 0.00 |         |      |

Among the lens group, the eleventh, the twelfth, the sixteenth, and the seventeenth lenses are non-spherical lens and data of the non-spherical coefficient is detailed below.

| ASPHERIC | CURV        | K          | A            | B            | C            | D            |
|----------|-------------|------------|--------------|--------------|--------------|--------------|
| A(1)     | 0.10869565  | 1.857295   | -5.59639E-04 | -2.86672E-05 | 1.37482E-06  | -2.11806E-07 |
| A(2)     | -0.05921250 | 18.875743  | 2.79820E-04  | 1.15734E-05  | -3.97808E-07 | 2.64222E-08  |
| A(3)     | -0.01976349 | 30.000000  | -8.91164E-03 | 3.17514E-04  | -3.98404E-05 | 1.09943E-06  |
| A(4)     | 0.07112851  | -30.000000 | -6.83788E-03 | 4.02008E-04  | -2.88249E-05 | 8.59032E-07  |

| ASPHERIC | CURV | K | A | B | C | D |
| --- | --- | --- | --- | --- | --- | --- |
| A(1) | 0.10869565 | 1.975102 | −5.14302E−04 | −3.07216E−05 | 1.64136E−06 | −1.91392E−07 |
| A(2) | −0.05992989 | 17.716451 | 3.10521E−04 | 7.53220E−06 | −4.28481E−08 | 3.08183E−08 |
| A(3) | 0.03536325 | −30.000000 | −1.19504E−02 | 7.49142E−04 | −8.45482E−05 | 3.10666E−06 |
| A(4) | 0.12509786 | −30.000000 | −5.85217E−03 | 2.07040E−04 | −1.75321E−05 | 6.38864E−07 |

Variables d3, d9, and d17 have the following data when the focal length changes:

|  | Z1 | Z2 | Z3 |
| --- | --- | --- | --- |
| Fno | 3.39 | 4.66 | 6.18 |
| f | 7.19 | 21.56 | 35.22 |
| w | 28.5 | 10.2 | 6.3 |
| d3 | 0.75 | 9.66 | 11.62 |
| d9 | 18.13 | 6.01 | 1.26 |
| d17 | 1.09 | 4.30 | 7.09 |

FIFTH EMBODIMENT

Referring to FIGS. 6A to 6D, a zoom lens system in accordance with a sixth preferred embodiment of the invention is shown. Initial optical data of the sixth embodiment is Fno=1: 3.184.63, f=7.10-34.79, and w=28.8°-6.3° where Fno is the diameter of aperture at the wide angle end or at the narrow angle end, f is the focal length of the overall system at the wide angle end or at the narrow angle end, and w is half view angle at the wide angle end or the narrow angle end. Specific numerical examples are shown in the following Table 5 in which r is the radius of curvature, d is an axial distance between any two lenses, n is the refractive index, and v is Abbe number.

TABLE 5

| Surface | r | d | n | v |
| --- | --- | --- | --- | --- |
| 1 | 21.877 | 1.00 | 1.84666 | 23.8 |
| 2 | 11.571 | 5.59 | 1.72626 | 42.6 |
| 3 | −958.916 | d3 | | |
| 4 | 3284.466 | 1.00 | 1.74397 | 44.9 |
| 5 | 6.836 | 3.06 | | |
| 6 | −16.460 | 1.00 | 1.66917 | 52.4 |
| 7 | 44.688 | 0.10 | | |
| 8 | 15.899 | 2.04 | 1.84666 | 23.8 |
| 9 | 464.873 | d9 | | |
| STO | INFINITY | 0.30 | | |
| 11 | A(1) | 1.47 | 1.58547 | 29.9 |
| 12 | A(2) | 0.10 | | |
| 13 | 5.417 | 2.59 | 1.52476 | 66.7 |
| 14 | −8.200 | 2.62 | 1.75520 | 27.6 |

TABLE 5-continued

| Surface | r | d | n | v |
| --- | --- | --- | --- | --- |
| 15 | 31.484 | 5.41 | | |
| 16 | A(3) | 1.54 | 1.61300 | 27.0 |
| 17 | A(4) | d17 | | |
| 18 | INFINITY | 0.85 | 1.51680 | 64.2 |
| 19 | INFINITY | 0.50 | | |
| IMG | INFINITY | 0.00 | | |

Among the lens group, the eleventh, the twelfth, the sixteenth, and the seventeenth lenses are non-spherical lens and data of the non-spherical coefficient is detailed below.

| ASPHERIC | CURV | K | A | B | C | D |
| --- | --- | --- | --- | --- | --- | --- |
| A(1) | 0.07478469 | 10.298625 | 4.64150E−04 | 1.60887E−05 | 1.52370E−06 | −1.09050E−07 |
| A(2) | 0.00244310 | 30.000000 | 1.03386E−03 | 5.49481E−05 | −2.19965E−07 | 1.58321E−07 |
| A(3) | −0.02910514 | 0.445263 | −8.23758E−03 | −2.39212E−04 | 2.98781E−06 | −2.59180E−06 |
| A(4) | 0.05176766 | −27.880386 | −6.27930E−03 | 1.43123E−04 | −9.59131E−06 | 3.93025E−07 |

Variables d3, d9, and d17 have the following data when the focal length changes:

|  | Z1 | Z2 | Z3 |
| --- | --- | --- | --- |
| Fno | 3.18 | 4.15 | 4.63 |
| f | 7.10 | 21.30 | 34.79 |
| w | 28.8 | 10.3 | 6.3 |
| d3 | 0.75 | 9.33 | 12.35 |
| d9 | 17.62 | 5.81 | 1.20 |
| d17 | 2.48 | 5.71 | 7.29 |

Data about the above five embodiments and conditions (a) to (h) are tabulated in Table 6 in which OAL/IMA in each of the above embodiments is less than 12.82 which is greatly less than that obtained in the prior art.

TABLE 6

|  | OAL/IMA | a<br>fw/f1 | b<br>fw/f2 | c<br>fw/f3 | d<br>Logz3/log3 | e<br>n11 | f<br>v11 | g<br>n16 | h<br>v16 |
| --- | --- | --- | --- | --- | --- | --- | --- | --- | --- |
| Ex1 | 12.82 | 0.16 | −0.64 | 0.70 | 0.76 | 1.53 | 56 | 1.53 | 56 |
| Ex2 | 12.82 | 0.19 | −0.72 | 0.72 | 0.61 | 1.49 | 58 | 1.53 | 56 |
| Ex3 | 12.82 | 0.20 | −0.75 | 0.75 | 0.56 | 1.49 | 58 | 1.61 | 27 |
| Ex4 | 12.82 | 0.20 | −0.76 | 0.75 | 0.55 | 1.53 | 56 | 1.49 | 58 |
| Ex5 | 12.82 | 0.21 | −0.78 | 0.74 | 0.47 | 1.59 | 30 | 1.61 | 27 | where

OAL/IMA is the ratio of total track of zoom system to image sensor size and the ratio is a reference value of the compactness of zoom system, $f_w$ is a focal length of the overall system at a wide angle end, $f_1$ is a focal length of the first lens group, $f_2$ is a focal length of the second lens group, $f_3$ is a focal length of the third lens group, Z is the change ratio of magnification of the overall system, $Z_3$ is a change ratio ($Z_3$=m3t/m3w) of magnification of the third lens group, m3t is a lateral magnification of the third lens group at a telescopic end, m3w is a lateral magnification of the third lens group at a wide angle end, n11 is the refractive index of the sixth lens L6, n16 is the refractive index of the ninth lens L9, v11 is the Abbe number of the sixth lens L6, and v16 is the Abbe number of the ninth lens L9.

The zoom lens system of the invention further satisfies one or more of the following conditions:

$$1.49 < n11 < 1.59 \quad (e)$$

$$1.49 < n16 < 1.61 \quad (f)$$

$$30 < v11 < 58 \quad (g)$$

$$27 < v16 < 58 \quad (h)$$

The zoom lens system of the invention has the following advantages and characteristics: High zoom ratio (e.g., as high as 4.91), OAL/IMA less than 12.82 which is greatly less than that obtained in the prior art, compactness, and lightweight. Moreover, the sixth and the ninth lenses L6, L9 are non-spherical lenses formed of a plastic material. The remaining lenses are conventional glass lenses. The non-spherical lenses can compensate aberration of the zoom lens system. Hence, the production cost is greatly reduced. In addition, the first and second lenses L1, L2 are formed as a single lens by applying adhesive therebetween, and, the seventh and eighth lenses L7, L8 are formed as a single lens by applying adhesive therebetween so as to facilitate assembly.

While the invention herein disclosed has been described by means of specific embodiments, numerous modifications and variations could be made thereto by those skilled in the art without departing from the scope and spirit of the invention set forth in the claims.

What is claimed is:

1. A zoom lens system comprising:
   a front first lens group including a first lens of divergent meniscus and a second lens of plano-convex;
   an intermediate second lens group including a third lens of plano-concave, a fourth lens of plano-concave, and a fifth lens of plano-convex; and
   a rear third lens group including a sixth lens of double-convex, a seventh lens of double-convex, an eighth lens of plano-concave, and a ninth lens of plano-concave,
   wherein the sixth and the ninth lenses are non-spherical lenses formed of a plastic material, and the zoom lens system satisfies the following conditions (a)-(d):

$$0.16 < f_w/f_1 < 0.21 \quad (a)$$

$$-0.78 < f_w/f_2 < -0.64 \quad (b)$$

$$0.70 < f_w/f_3 < 0.75 \quad (c)$$

$$0.47 < \log Z_3/\log Z < 0.76 \quad (d)$$

where
   $f_w$ is a focal length of the overall system at a wide angle end,
   $f_1$ is a focal length of the first lens group,
   $f_2$ is a focal length of the second lens group,
   $f_3$ is a focal length of the third lens group,
   Z is the change ratio of magnification of the overall system,
   $Z_3$ is a change ratio ($Z_3$=m3t/m3w) of magnification of the third lens group,
   m3t is a lateral magnification of the third lens group at a telescopic end, and
   m3w is a lateral magnification of the third lens group at a wide angle end.

2. The zoom lens system of claim 1, wherein the first and the second lenses are formed as a single lens by applying adhesive therebetween.

3. The zoom lens system of claim 1, wherein the seventh and the eighth lenses are formed as a single lens by applying adhesive therebetween.

4. The zoom lens system of claim 1, wherein the zoom lens system satisfies the following condition:

$$1.49 < n11 < 1.59 \quad (e)$$

where
   n11 is a refractive index of the sixth lens.

5. The zoom lens system of claim 1, wherein the zoom lens system satisfies the following condition:

$$1.49 < n16 < 1.61 \quad (f)$$

where
   n16 is a refractive index of the ninth lens.

6. The zoom lens system of claim 1, wherein the zoom lens system satisfies the following condition:

$$30 < v11 < 58 \quad (g)$$

where
   v11 is an Abbe number of the sixth lens.

7. The zoom lens system of claim 1, wherein the zoom lens system satisfies the following condition:

$$27<v16<58 \qquad (h)$$

where
v16 is an Abbe number of the ninth lens.

8. The zoom lens system of claim 1, wherein the zoom lens system satisfies the following conditions:

$$1.49<n11<1.59$$

$$149<n16<1.61$$

$$30<v11<58$$

$$27<v16<58$$

where
n11 is a refractive index of the sixth lens,
n16 is a refractive index of the ninth lens,
v11 is an Abbe number of the sixth lens, and
v16 is an Abbe number of the ninth lens.

* * * * *